(12) United States Patent
Xu et al.

(10) Patent No.: US 11,983,128 B1
(45) Date of Patent: May 14, 2024

(54) MULTIDIMENSIONAL AND MULTIBLOCK TENSORIZED DIRECT MEMORY ACCESS DESCRIPTORS

(71) Applicant: Amazon Technologies, Inc., Seattle, WA (US)

(72) Inventors: Kun Xu, Austin, TX (US); Ron Diamant, Santa Clara, CA (US); Ilya Minkin, Los Altos, CA (US); Mohammad El-Shabani, Redwood City, CA (US); Raymond S. Whiteside, Austin, TX (US); Uday Shilton Udayaselvam, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/067,109

(22) Filed: Dec. 16, 2022

(51) Int. Cl.
*G06F 13/30* (2006.01)
*G06F 13/16* (2006.01)

(52) U.S. Cl.
CPC .......... *G06F 13/30* (2013.01); *G06F 13/1621* (2013.01); *G06F 13/1642* (2013.01)

(58) Field of Classification Search
CPC .. G06F 13/1668; G06F 13/30; G06F 13/1642; G06F 13/1621; G06N 3/04
See application file for complete search history.

(56) References Cited

U.S. PATENT DOCUMENTS

| | | | |
|---|---|---|---|
| 8,733,860 B1 | 5/2014 | Burke et al. | |
| 11,494,326 B1* | 11/2022 | Xu | G06N 3/06 |
| 11,550,736 B1 | 1/2023 | Xu et al. | |
| 2007/0005825 A1* | 1/2007 | Henson | G06F 13/1694 710/22 |
| 2011/0078342 A1* | 3/2011 | Siddabathuni | G06F 13/28 710/52 |
| 2014/0189169 A1 | 7/2014 | Litch et al. | |
| 2015/0006765 A1* | 1/2015 | Litch | G06F 13/28 710/22 |
| 2018/0300614 A1* | 10/2018 | Ambardekar | H04L 67/02 |
| 2020/0327078 A1* | 10/2020 | Zhao | G06F 13/28 |
| 2023/0394276 A1* | 12/2023 | Khatamifard | G06N 3/04 |

OTHER PUBLICATIONS

U.S. Notice of Allowance dated Sep. 19, 2022 in U.S. Appl. No. 17/449,581.

\* cited by examiner

*Primary Examiner* — Raymond N Phan
(74) *Attorney, Agent, or Firm* — Weaver Austin Villeneuve & Sampson LLP

(57) ABSTRACT

Techniques to reduce overhead in a direct memory access (DMA) engine can include processing descriptors from a descriptor queue to obtain a striding configuration to generate tensorized memory descriptors. The striding configuration can include, for each striding dimension, a stride and a repetition number indicating a number of times to repeat striding in the corresponding striding dimension. One or more sets of tensorized memory descriptors can be generated based on the striding configuration. Data transfers are then performed based on the generated tensorized memory descriptors.

21 Claims, 16 Drawing Sheets

MULTIDIMENSIONAL AND MULTIBLOCK TENSORIZED DIRECT MEMORY ACCESS DESCRIPTORS

BACKGROUND

Neural networks can be trained using machine learning techniques to perform a certain computing task for an application. The trained neural network can then perform the computing task, for example, to generate an inference from input data. Computing tasks that neural networks can perform may include human-like functions such as visual and audial perception, natural language processing, etc.

BRIEF DESCRIPTION OF THE DRAWINGS

Various embodiments in accordance with the present disclosure will be described with reference to the drawings, in which.

DETAILED DESCRIPTION

Figure 1:
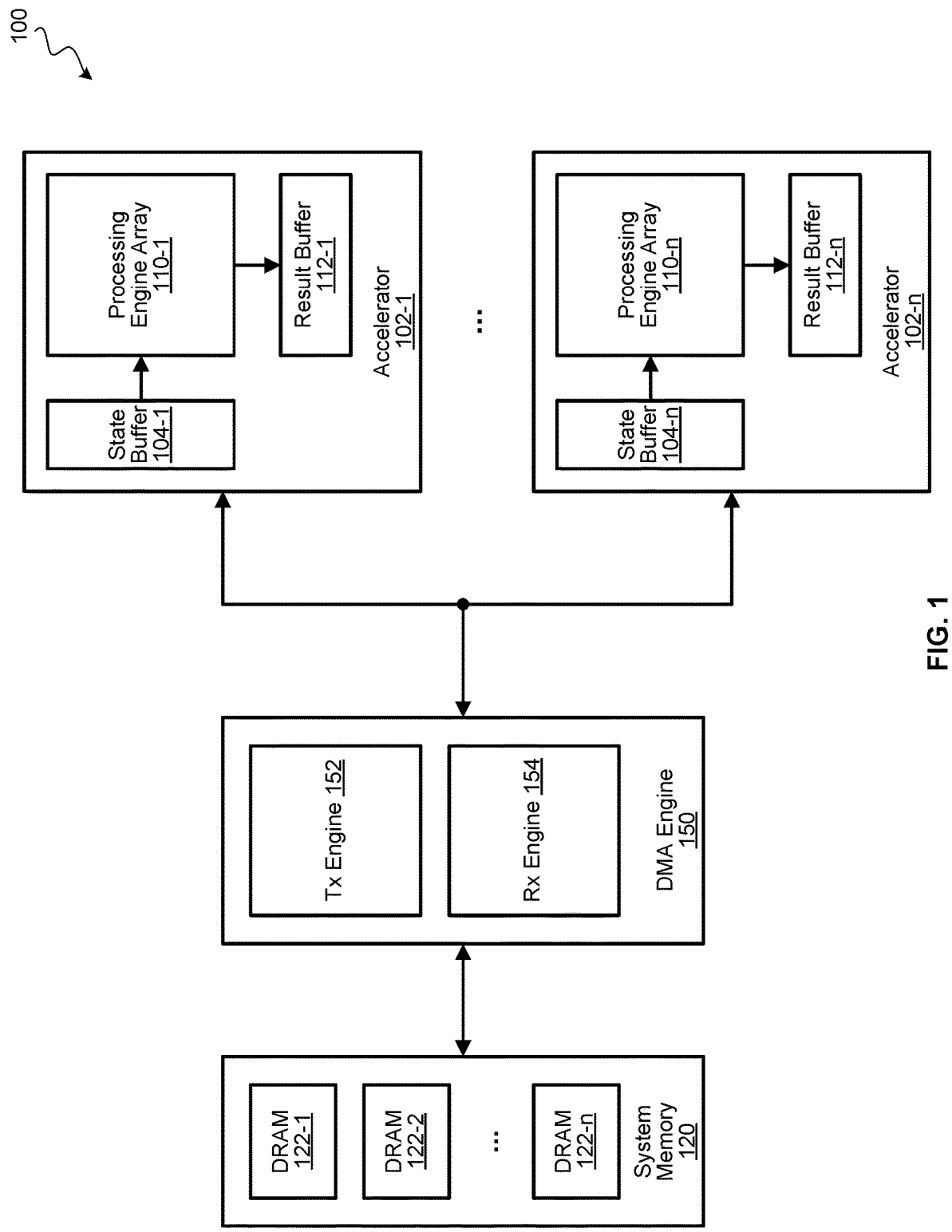
FIG. 1 illustrates a block diagram of an example of a computing system.

Training a neural network and/or performing inference on an accelerator may involve transferring data between the accelerator and system memory (e.g., dynamic random access memory (DRAM)). These data transfers are performed because the local memory of the accelerator may lack sufficient storage capacity to store an entire neural network model. Training may also involve exchanging a large number of weight gradients. In systems with multiple accelerators, the weight gradients can be copied to system memory to facilitate the data exchange. To improve latency and throughput, the data transfers between an accelerator and system memory can be performed using direct memory access (DMA) to limit the involvement of the host processor. However, DMA utilizes memory descriptors to perform the data transfers, and retrieving the memory descriptors incurs additional overhead for the DMA transfers.

By way of example, an end-to-end DMA transfer may utilize two memory descriptors (one memory descriptor to read the data from the source, and one memory descriptor to write the data to the destination). Each memory descriptor can be, for instance, 16 bytes in length. For a data transfer of 256 bytes, the DMA overhead is hence (2*32 bytes)/256 bytes or 12.5%. As the data transfer size becomes smaller, the advantage of using DMA diminishes due to the overhead of retrieving the memory descriptors. The data being transferred between the accelerator and system memory are not necessarily stored contiguously in the accelerator's local memory. As such, increasing the data transfer size per data transfer may not be possible. As a result, a large number of small data transfers between the accelerator and system memory may be performed.

To reduce the overhead of performing a large number of DMA transfers, the techniques disclosed herein tensorize the memory descriptors used by DMA. Tensorization may refer to the transformation or mapping of lower-order data to higher-order data. For instance, the techniques disclosed herein can transform a base descriptor into a series of memory descriptors to effectuate a large number of data transfers stemming from the base descriptor. The base descriptor from which the series of memory descriptors are generated can be referred to as a tensorized template descriptor. The memory descriptors generated from the tensorized template descriptor can be referred to as tensorized memory descriptors. Tensorization of the memory descriptors can significantly reduce the overhead and memory bandwidth used to retrieve the memory descriptors. For example, instead of having to retrieve hundreds or thousands of memory descriptors, a tensorized template descriptor can be retrieved to effectuate hundreds or thousands of DMA transfers. Tensorization of the memory descriptors also reduces the amount of memory needed to store the memory descriptors because the hundreds or thousands of memory descriptors can be condensed into a tensorized template descriptor. The physical size of the DMA engine can also be reduced because the size of the descriptor buffer within the DMA engine can be reduced. Instead of having to buffer hundreds of memory descriptors, the DMA engine may only need to buffer a few descriptors to transfer a large amount of data.

In some scenarios, a series of data transfers can occur at memory addresses with multidimensional strides. For example, a series of data transfers can be used to move tensors that have the same striding pattern. The multiple tensors may correspond to batches of multiple two-dimensional tensors (e.g., feature map tensors). The individual tensors may have two striding dimensions, and the batches can be a third striding dimension. Distributing the batches across memory partitions can be a fourth striding dimension. The multidimensional strides can be analogous to a multi-level loopnest used to define the access pattern of the multidimensional tensors. To facilitate the generation of memory descriptors with addresses having multidimensional strides, the striding information can be provided in a sequence of tensorized header descriptors. Each tensorized header descriptor can provide striding information for one dimension of the multiple striding dimensions.

In some scenarios, a series of data transfers can be performed on data blocks that have the same striding pattern, but the data blocks themselves do not have a common or uniform stride. In such scenarios, a sequence of tensorized template descriptors can be used to generate multiple sets of tensorized memory descriptors with each set representing the data transfer of a data block. Various combinations of the tensorized header descriptors and tensorized template descriptors can be used to effectuate generation of tensorized memory descriptors for single or multiple data block transfers, in which the tensorized memory descriptors have addresses with single or multidimensional striding patterns. Tensorized memory descriptors generated with multidimensional striding or for multiple data blocks can be referred to as high order tensorized memory descriptors.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100. Computing system 100 includes a DMA engine 150, a system memory 120, and one or more accelerators 102-1 to 102-n. Computing system 100 may include other components not specifically shown, such as a host processor. Accelerator 102-1 can be a neural network accelerator (e.g., a neural network processor, tensor processing unit, etc.), and may include a processing engine array 110-1 (e.g., a systolic array), a state buffer 104-1, and a result buffer 112-1. Processing engine array 110-1 may include an array of processing engines arranged in rows and columns. Each processing engine is capable of performing a multiply-and-add operation (e.g., to perform matrix multiplication operations for a neural network model). State buffer 104-1 is used to store input data such as feature map values and weight values for processing engine array 110-1. During operation, the input data are shifted into processing engine array 110-1 from state buffer 104-1 along the rows of the array. The computation results of the processing engines are accumulated along the column direction, and the column output data are stored in result buffer 112-1. Other accelerators in computing system 100 such as accelerator 102-n may have a similar architecture as accelerator 102-1.

In most instances, tensors processed by computing system 100 may have thousands or even millions of elements. Because not all elements of a tensor can fit within accelerators 102-1 to 102-n at the same time, system memory 120 can be used to store data that are not currently being processed in accelerators 102-1 to 102-n. System memory 120 can also be used to facilitate data exchanges between accelerators 102-1 to 102-n (e.g., gradient exchange during training). As computations are carried out, data needed by accelerators 102-1 to 102-n can be transferred from system memory 120 into the respective accelerator, and data no longer needed by accelerators 102-1 to 102-n can be transferred from the respective accelerator to system memory 120. System memory 120 can be implemented using one or more dynamic random access memory (DRAM) devices 122-1 to 122-n and/or other types of memories. In other implementations, system memory can be implemented, for example, with static random access memory (SRAM), flash memory, 3D cross-point memory, or any combination thereof.

Data transfers between system memory 120 and other components of computing system 100 may involve a host processor (not shown) to issue read and write commands to system memory 120. Such memory accesses through a host processor may incur unnecessary latency, especially when the host processor is not a consumer or generator of the data being accessed. To bypass the host processor, DMA engine 150 can be used to directly exchange data between system memory 120 and accelerators 102-1 to 102-n. DMA engine 150 may include a transmit (Tx) engine 152 and a receive (Rx) engine 154. Tx engine 152 can be used by DMA engine 150 to obtain data (e.g., to read data from the local memories of accelerators 102-1 to 102-n such as their state buffer, result buffer, etc.), and the Rx engine 154 can be used by the DMA engine to provide data (e.g., to write data to system memory 120, etc.). Tx engine 152 and Rx engine 154 can operate independently, and the connectivity and directionality of data transfers can be flexible by using the two engines. It should also be noted that although only one DMA engine 150 is shown, computing system 100 may include additional DMA engines, and each DMA engine can be allocated for data transfers between a certain subset of components.

Figure 2:
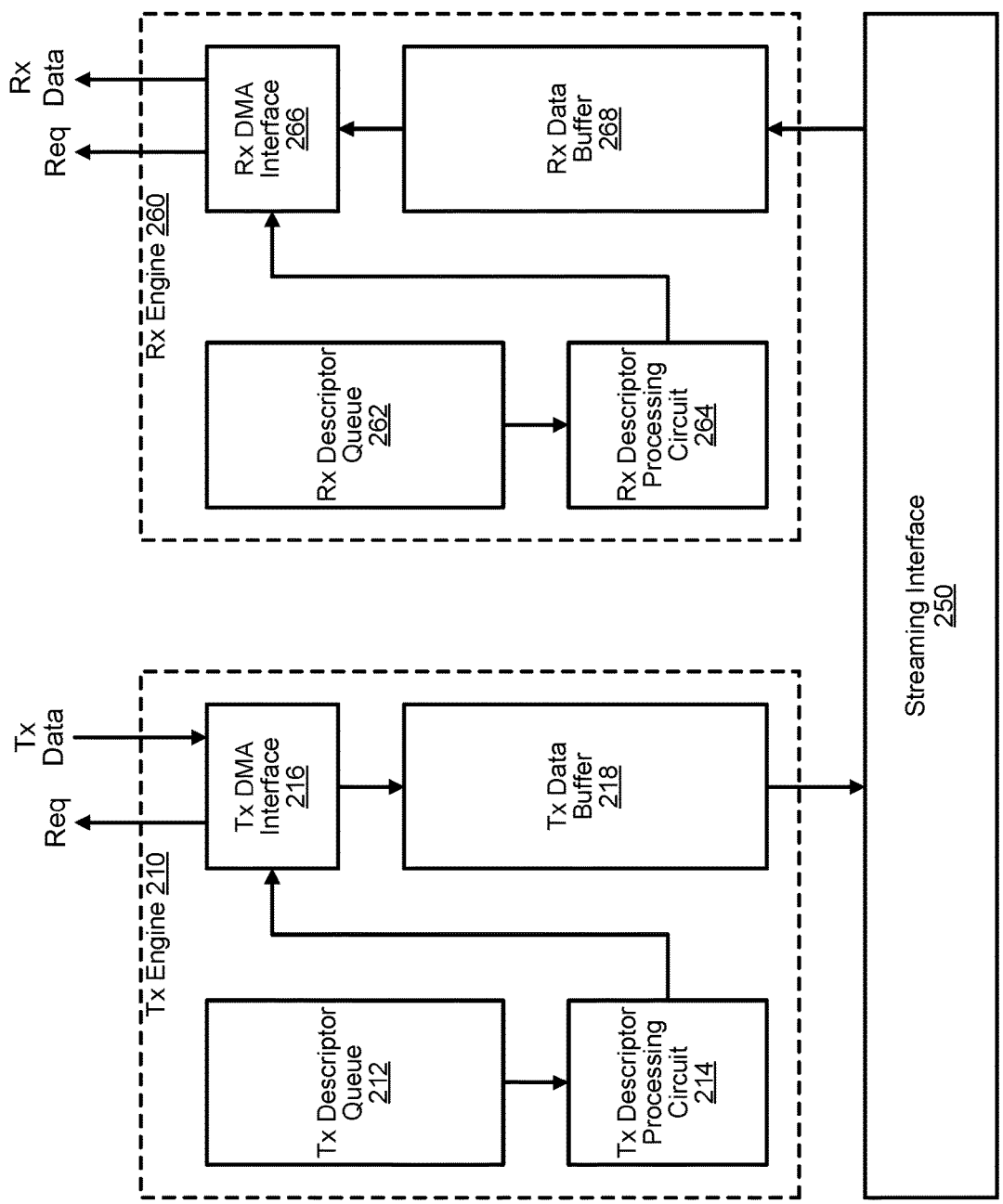
FIG. 2 illustrates a block diagram of an example of a direct memory access (DMA) engine.

FIG. 2 illustrates a more detailed block diagram of an example of a DMA engine 200. DMA engine 200 is a type of integrated circuit device that can perform data transfers between components of a computing system without direct involvement of a host processor. DMA engine 200 can be one implementation of DMA engine 150 in computing system 100. DMA engine 200 may include a Tx engine 210 and a Rx engine 260 coupled to a streaming interface 250. Tx engine 210 and Rx engine 260 can operate independently from each other. In some implementations, data from Tx data buffer 218 can be streamed to Rx data buffer 268 via streaming interface 250. In some implementations, streaming interface 250 can also be coupled to other components of a computing system to allow other components to obtain data from streaming interface 250 or to provide data to streaming interface 250.

Tx engine 210 may include a Tx descriptor queue 212, a Tx descriptor processing circuit 214, a Tx DMA interface 216, and a Tx data buffer 218. Tx descriptor queue 212 is a descriptor buffer/FIFO that stores a set of descriptors pending processing by DMA engine 210. In some implementations, Tx descriptor FIFO 212 can be implemented as a ring queue. A head pointer can be used to indicate the location of the next descriptor to process, and a tail pointer can be used to indicate the location of the last descriptor available in the queue. As descriptors are process and descriptors are added to Tx descriptor FIFO 212, the head and tail pointers can be updated.

Tx descriptor processing circuit 214 is configured to process descriptors retrieved from Tx descriptor queue 212. For example, Tx descriptor processing circuit 214 may retrieve a descriptor from descriptor queue 212, and parse the descriptor to determine the descriptor type of the descriptor to take the appropriate actions. In some implementations, DMA engine 200 may support different types of descriptors such as metadata descriptors and memory descriptors. Metadata descriptors can be used to pass information to DMA engine 200 (e.g., to configure DMA engine 200), whereas memory descriptors can be used to perform data transfers. If the descriptor retrieved from Tx descriptor queue 212 is a memory descriptor, Tx descriptor processing circuit 214 may provide the memory descriptor to Tx DMA interface 216 to perform the requested data transfer. In some implementations, if the descriptor retrieved from Tx descriptor queue 212 is a tensorized header descriptor, Tx descriptor processing circuit 214 may setup a striding configuration based on striding information in the tensorized header descriptor. Subsequent to setting up the striding configuration, if the descriptor retrieved from Tx descriptor queue 212 is a tensorized template descriptor, Tx descriptor processing circuit 214 may generate a series of memory descriptors based on the tensorized template descriptor, and sequentially provide the generated memory descriptors (e.g., tensorized memory descriptors) to Tx DMA interface 216.

By way of example, Tx descriptor processing circuit 214 can be operable to obtain a descriptor packet that includes at least one tensorized header descriptor and at least one tensorized template descriptor from Tx descriptor queue 212. The descriptor packet may occupy multiple descriptor entries in the descriptor queue. For example, each tensorized header descriptor may occupy one descriptor entry in the descriptor queue, and each tensorized template descriptor may occupy one descriptor entry in the descriptor queue. When a descriptor packet is encountered, Tx descriptor processing circuit 214 can generate tensorized memory descriptors using the template provided by the tensorized template descriptor according to a striding configuration provided by the tensorized header descriptor, and provide the Tx DMA interface 216 with each of the tensorized memory descriptors to perform data transfers. In some implementations, a descriptor packet may include multiple tensorized header descriptors, and each tensorized header descriptor can add a striding dimension to the striding configuration. In some implementations, a descriptor packet may include multiple tensorized template descriptors, and each tensorized template descriptor can spawn its own set of tensorized memory descriptors from the respective template based on the current striding configuration.

Tx DMA interface 216 is configured to perform data transfers based on memory descriptors (including tensorized memory descriptors) provided from Tx descriptor processing circuit 214. For example, a memory descriptor provided by Tx descriptor processing circuit 214 may include a data transfer size or data length, and an address indicating the location of the data. Tx DMA interface 216 may send a request to the component of the computing system mapped to the address indicated in the memory descriptor to obtain the data length amount of data from that address. The data obtained from the address is then written into Tx data buffer 218. Streaming interface 250 may read the data stored in Tx data buffer 218 and provide that data to the intended data consumer.

Rx engine 260 may include a Rx descriptor queue 262, a Rx descriptor processing circuit 264, a Rx DMA interface 266, and a Rx data buffer 268. The components of Rx engine 260 operate in a similar manner as Tx engine 210 with the exception that instead of obtaining data from components of a computing system, Rx DMA interface 266 is used for transferring data to components of the computing system. For example, in response to a memory descriptor provided by Rx descriptor processing circuit 264, Rx DMA interface 216 may read data from Rx data buffer 268 provided by streaming interface 250, and transfer that data to a component of the computing system. The amount of data being read can be indicated by a data length provided in the memory descriptor, and Rx DMA interface 266 may write that data to the address provided in the memory descriptor.

Figure 3:
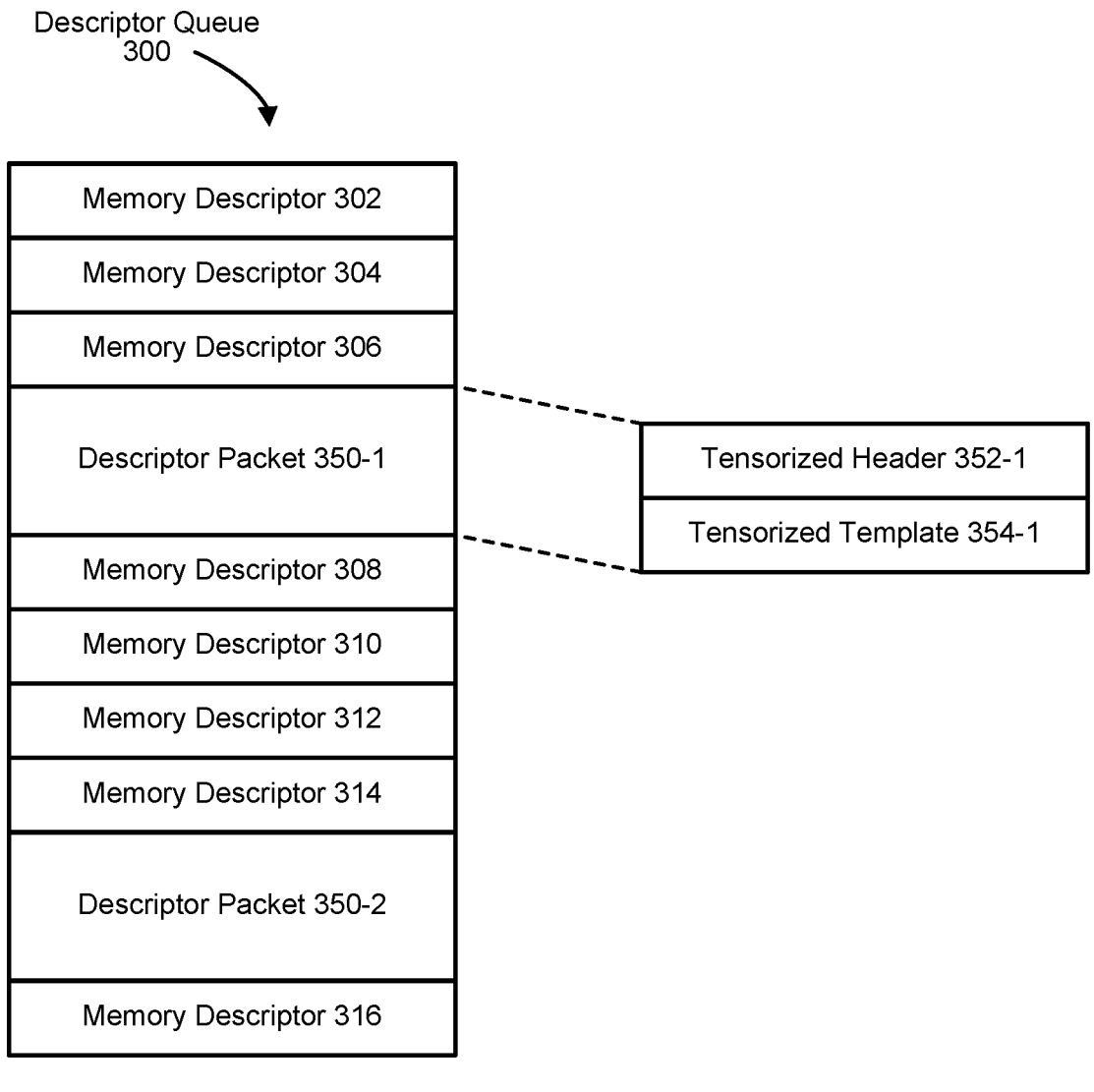
FIG. 3 illustrates a conceptual diagram of an example of a descriptor queue.

FIG. 3 illustrates a conceptual diagram of an example of a descriptor queue 300. Descriptor queue 300 can be, for example, Tx descriptor queue 212 or Rx descriptor queue 262. Descriptor queue 300 may store a mixture of different types of descriptors. For example, descriptor queue may store memory descriptors 302, 304, 306, 308, 310, 312, 314, and 316. Descriptor queue may also store descriptor packets 350-1 and 350-2. In addition, descriptor queue 300 may store other types of descriptors (e.g., other types of metadata descriptors) not specifically shown.

A descriptor packet may occupy more bytes than a memory descriptor, and can be composed of multiple descriptors. For example, in some implementations, a memory descriptor may occupy 16 bytes, and a descriptor packet 350-1 may occupy at least 32 bytes, and be composed of at least two descriptors—a tensorized header descriptor 2 and a tensorized template descriptor. A tensorized descriptor may occupy more bytes than a memory descriptor, because a tensorized descriptor may include a tensorized header and a tensorized template (e.g., tensorized descriptor 352 may include tensorized header 352-1 and tensorized template 354-1). The tensorized template descriptor 354-1 resembles a normal memory descriptor, and thus the tensorized template descriptor 354-1 may occupy the same number of bytes as a normal memory descriptor. The tensorized header descriptor 352-1 provides tensorized attributes that can be used to generate a series of memory descriptors based on the template. In some implementations, to keep the number of bytes consistent when reading descriptors from descriptor queue 300 and to simplify the pointer updates, the tensorized header descriptor 352-1 may occupy the same number of bytes as a normal memory descriptor.

According to some implementations, a descriptor processing circuit (e.g., Tx descriptor processing circuit 214, Rx descriptor processing circuit 264) may retrieve a descriptor corresponding to a certain number of bytes (e.g., 16 bytes) at a time to process. If the descriptor retrieved by the descriptor processing circuit is a normal memory descriptor, the descriptor processing circuit may provide the memory descriptor to the DMA interface to perform the corresponding data transfer. If the descriptor retrieved by the descriptor processing circuit is a tensorized header descriptor (which can be considered as a type of metadata descriptor), the descriptor processing circuit may store attributes provided in the tensorized header descriptor to setup a striding configuration for generation of tensorized memory descriptors, and retrieve the next descriptor from descriptor queue 300 to process. In some implementations, the next descriptor following the tensorized header descriptor can be a tensorized template descriptor, and the descriptor processing circuit may generate a series of tensorized memory descriptors having the same template as the tensorized template descriptor according to the attributes (e.g., striding configuration) provided in the tensorized header descriptor.

Figure 4:
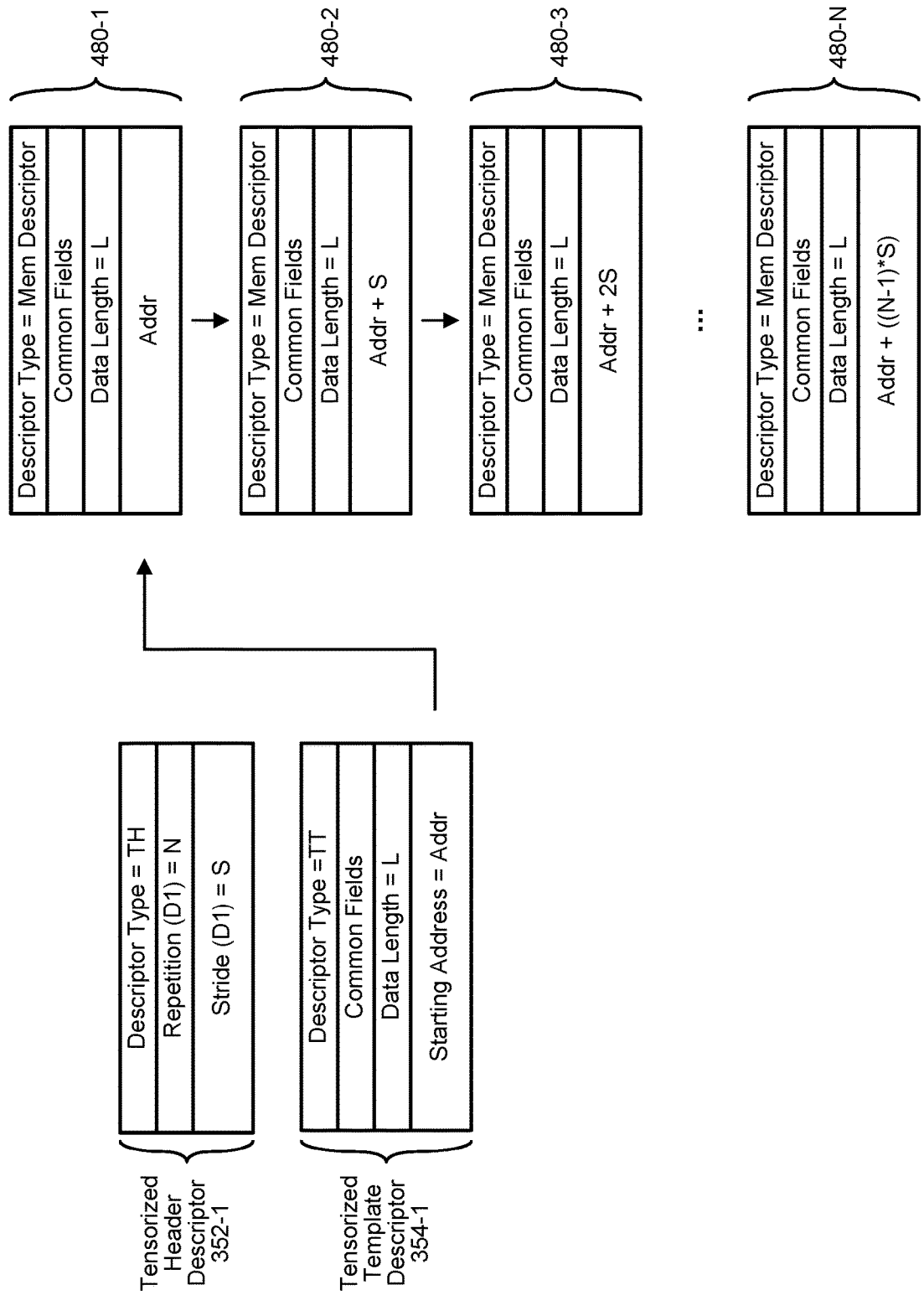
FIG. 4 illustrates a conceptual diagram of an example of processing a descriptor packet.

FIG. 4 illustrates a conceptual diagram of an example of processing a descriptor packet (e.g., descriptor packet 350-1). As described above, a descriptor packet 350-1 may include a tensorized header descriptor 452-1 and a tensorized template descriptor 454-1. Tensorized header descriptor 452-1 may include a descriptor type to identify tensorized header descriptor 452-1 as a tensorized header (TH) descriptor. Tensorized header descriptor 452-1 may also include a repetition number field to indicate the number of times to repeat striding in the current striding dimension, and a stride field to indicate a stride to offset the address for each successive memory descriptor being generated. In some implementations, the stride value stored in the stride field can be defined using a number of bits that spans a full address range of the computing system. In other words, the number of bits occupied by the stride field may be sufficient to span the entire address range of the computing system. By way of example, the stride field may occupy 64 bits to cover a 64-bit address range. Such implementations may allow the generated memory descriptors to cover addresses mapped to multiple accelerators of the computing system such that data can be distributed to each of the accelerators. In other words, this may allow an address of a generated memory descriptor to be mapped to a first accelerator, and an address of the next generated memory descriptor to be mapped to a second accelerator (e.g., by having a striding distance sufficient to step across an entire accelerator).

Tensorized template descriptor 454-1 may include a descriptor type to identify tensorized template descriptor 454-1 as a tensorized template (TT) descriptor. Tensorized template descriptor 454-1 may have a structure and fields that resemble those of a normal memory descriptor. For example, tensorized template descriptor 454-1 may include a data length field to indicate the data transfer size requested by a memory descriptor, and an address field with a starting address indicating the address of the first tensorized memory descriptor generated from the tensorized template descriptor 454-1. In addition, tensorized template descriptor 454-1 may include a set of common fields that are common to all the tensorized memory descriptors being generated from the tensorized template descriptor 454-1. The common fields may include, for example, an operation type to indicate the type of data transfer operation being requested (e.g., data copy, transpose, etc.), and a datatype indicating the type of data being transferred, etc.

Given the striding configuration obtained from the tensorized header descriptor 452-1 and the memory descriptor template of the tensorized template descriptor 454-1, a series of tensorized memory descriptors 480-1 to 480-N can be generated. For example, the descriptor processing circuit (e.g., Tx descriptor processing circuit 214, Rx descriptor processing circuit 264) of a DMA engine may include descriptor generation circuitry that is activated in response to a tensorized header descriptor being retrieved from a descriptor queue (as indicated by the descriptor type). The striding configuration obtained from tensorized header descriptor 452-1 can be used to configure the descriptor generation circuitry. The descriptor generation circuitry of the descriptor processing circuit may implement a counter for each striding dimension to track the number of strides taken in the corresponding striding dimension. The repetition number field in tensorized header descriptor can be used to configure the upper limit for the counter.

Using descriptor packet 450-1 as an example, there is only one tensorized header descriptor 452-1, and thus the striding configuration is set to perform striding in one dimension. The counter can be incremented for each memory descriptor that is generated for each stride from the starting address provided by tensorized template descriptor 454-1, and when the counter reaches the upper limit set by the repetition number field in tensorized header descriptor 452-1, the descriptor generation circuitry can be disabled to cease generation of tensorized memory descriptors until another tensorized header descriptor is retrieved by the descriptor processing circuit. The descriptor generation circuitry may also implement adders that are used to calculate addresses for the tensorized memory descriptors being generated. The stride field in tensorized header descriptor 452-1 can be used to determine a value that is added to each successive address to derive the addresses for the tensorized memory descriptors being generated.

Upon obtaining the striding configuration from tensorized header descriptor 452-1, the descriptor processing circuit may retrieve tensorized template descriptor 454-1 from the descriptor queue. To generate tensorized memory descriptor 480-1, the descriptor generation circuitry can use tensorized template descriptor 454-1 as a template, and modify the descriptor type to indicate a memory descriptor. The data length field and other common fields of tensorized memory descriptor 480-1 can remain the same as tensorized template descriptor 454-1. The first tensorized memory descriptor being generated from a tensorized template descriptor uses the starting address in the tensorized template descriptor as the address provided in the memory descriptor. Hence, the starting address provided in tensorized template descriptor 454-1 is used as the address for tensorized memory descriptor 480-1. Tensorized memory descriptor 480-1 generated by the descriptor generation circuitry can then be provided to the DMA interface of the DMA engine to perform the data transfer according to the attributes in the tensorized memory descriptor 480-1 (e.g., to read or write the data length amount of data at the address indicated in tensorized memory descriptor 480-1).

After generating tensorized memory descriptor 480-1, the descriptor generation circuitry of the descriptor processing circuit can generate the next tensorized memory descriptor 480-2. To generate the next tensorized memory descriptor 480-2, the descriptor generation circuitry can offset the address of tensorized memory descriptor 480-1 using the stride indicated in tensorized header tensorized 452-1 (e.g., by incrementing the address of tensorized memory descriptor 480-1 with the stride). Tensorized memory descriptor 480-2 generated by the descriptor generation circuitry may then be provided to the DMA interface of the DMA engine to perform the data transfer according to the attributes of tensorized memory descriptor 480-2 (e.g., to read or write the data length amount of data at the address indicated in tensorized memory descriptor 480-2). This process of generating a tensorized memory descriptor (e.g., by offsetting the address of the previous memory descriptor with the stride) is repeated for the number of repetitions N to generate tensorized memory descriptors 480-1 to 480-N.

It should be noted that in some implementations, each tensorized memory descriptor generated on the fly can be processed to effectuate the corresponding data transfer before or while the next tensorized memory descriptor is being generated. In this manner, the DMA engine need not allocate additional buffer storage to store more than one generated tensorized memory descriptor. In other words, the DMA engine may only need to store one generated tensorized memory descriptor at a time. The descriptor processing circuit of the DMA engine may sequentially generate a tensorized memory descriptor, provide the generated memory descriptor to the DMA interface to perform the data transfer, and then generate the next tensorized memory descriptor. In some implementations, a descriptor buffer that can store several memory descriptors can implemented to buffer a few tensorized memory descriptors before their data transfers are processed.

Figure 5:
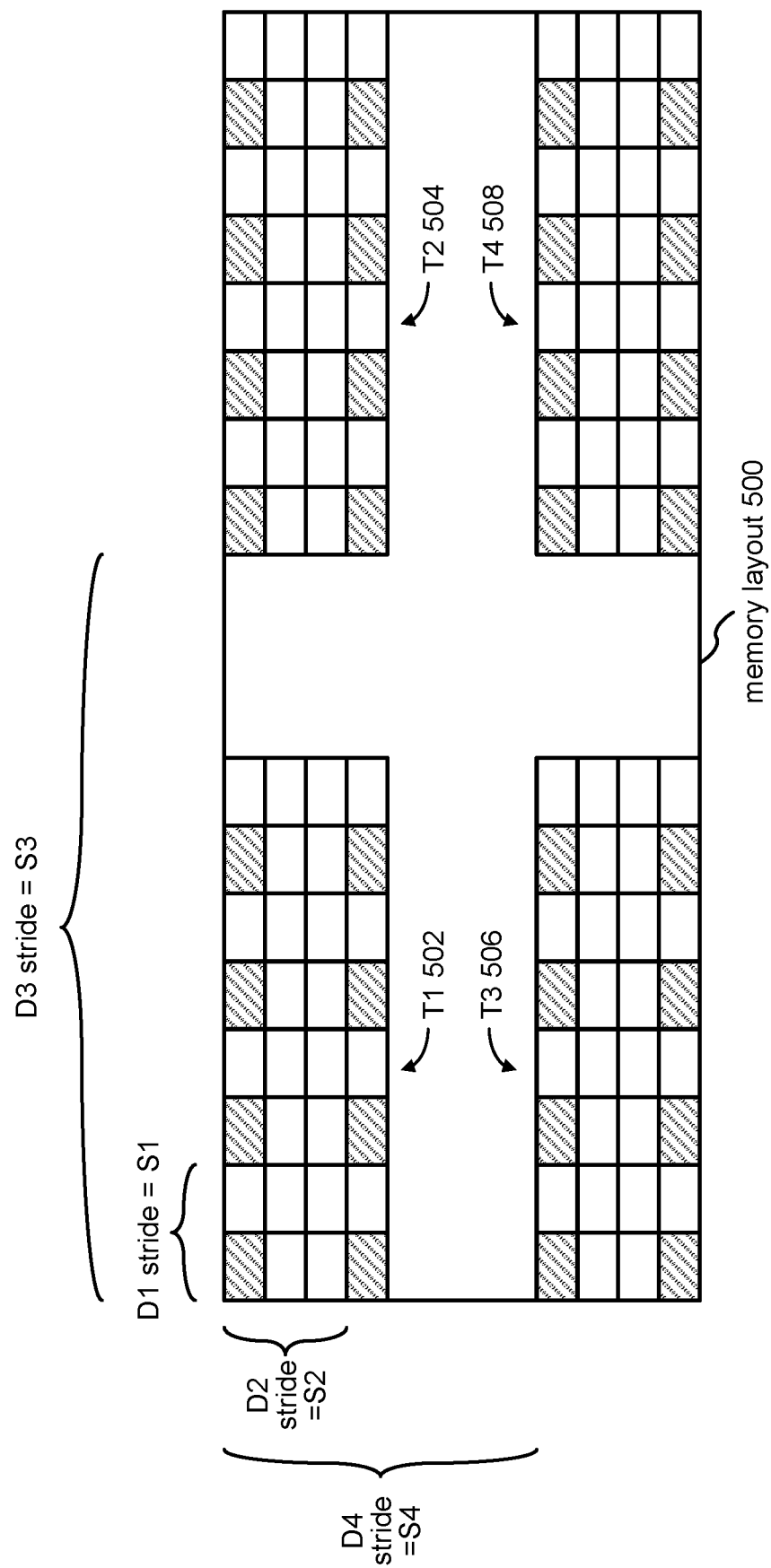
FIG. 5 illustrates an example of data blocks in a memory layout.

FIG. 5 illustrates an example of a memory layout 500 for data with multidimensional striding. In the example shown, four tensors that each contains eight data elements can be arranged in memory as indicated by the cells with the diagonal fill pattern. Tensor T1 502 may include eight data elements arranged in two rows of four data elements each. The four data elements in the first row are each spaced apart by a stride of S1 in the first dimension (D1). The four data elements in the second row are also each spaced apart by the D1 stride of S1. The two rows of data block B1 are spaced apart by a stride of S2 in second dimension (D2). The data elements within each of the other tensors are arranged in a similar manner (with the same D1 stride of S1 and D2 stride of S2). Tensor T2 504 is spaced apart from tensor T1 502 by a stride of S3 in the third dimension (D3). Tensor T3 506 is spaced apart from tensor T1 502 by a stride of S4 in the fourth dimension (D4). Tensor T4 508 is spaced apart from Tensor T1 502 by the D3 stride of S3 and the D4 stride of S4.

Each of the striding distances S1, S2, S3, and S4 (representing address offsets) for the four respective striding dimensions can be different, and thus a single stride value may not be able to generate tensorized memory descriptors to effectuate data transfer of the four tensors. In order to tensorize the memory descriptor generation, a multidimensional striding configuration can be used to generate tensorized memory descriptors to perform data transfer of the four tensors.

Figure 6:
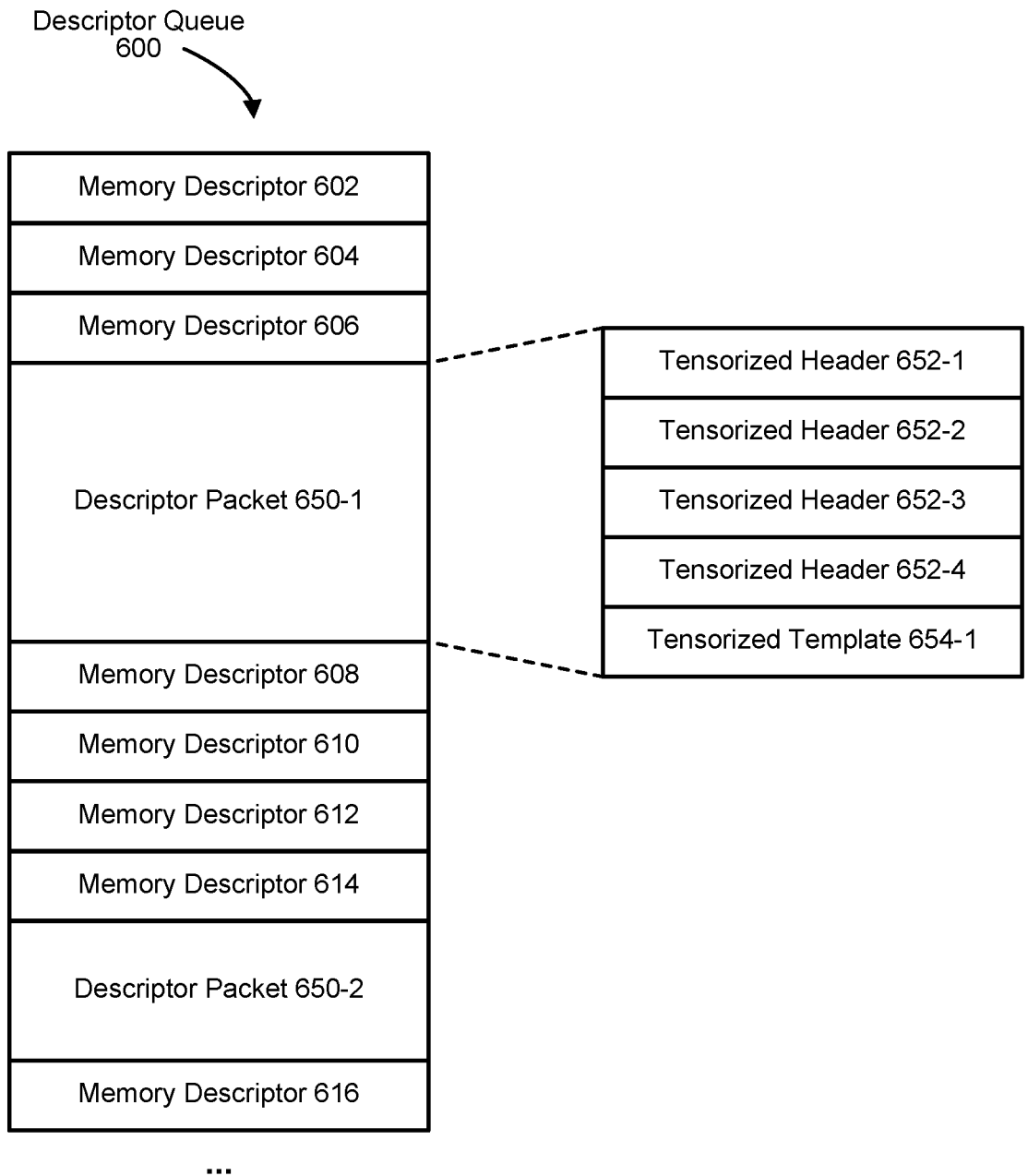
FIG. 6 illustrates a conceptual diagram of another example of a descriptor queue.

FIG. 6 illustrates a conceptual diagram of an example of a descriptor queue 600 storing a descriptor packet 650-1 that can be used to implement a multidimensional striding configuration. Descriptor queue 600 can be, for example, Tx descriptor queue 212 or Rx descriptor queue 262. Descriptor queue 600 may store a mixture of different types of descriptors. For example, descriptor queue 600 may store memory descriptors 602, 604, 606, 608, 610, 612, 614, and 616. Descriptor queue 600 may also store descriptor packets 650-1 and 650-2. In addition, descriptor queue 600 may store other types of descriptors (e.g., other types of metadata descriptors) not specifically shown.

In the example shown, descriptor packet 650-1 includes a sequence of four tensorized header descriptors 652-1, 652-2, 652-3, and 652-4, followed by one tensorized template descriptor 654-1. Each of the four tensorized header descriptors 652-1, 652-2, 652-3, and 652-4 can provide striding information for a striding dimension. In some implementations, each successive tensorized header descriptor in the sequence of tensorized header descriptors can provide the striding information for a higher striding dimension. For example, tensorized header descriptor 652-1 can provide the stride information for the first striding dimension D1, tensorized header descriptor 652-2 can provide the stride information for the second striding dimension D2, tensorized header descriptor 652-3 can provide the stride information for the third striding dimension D3, and tensorized header descriptor 652-4 can provide the stride information for the fourth striding dimension D4. The striding information included in each tensorized header descriptor may include a stride and a repetition number indicating the number of times to repeat striding in the corresponding striding dimension.

The descriptor processing circuit can obtain and process the tensorized header descriptors sequentially from descriptor queue 600. As each tensorized header descriptor is processed, an additional striding dimension can be added to the current striding configuration. The descriptor generation logic can derive the addresses for the generated memory descriptors by implementing a counter in each striding dimension that rolls over when the count reaches the number of repetitions indicated in the tensorized header descriptor for the corresponding striding dimension. The counter is incremented each time a stride is taken in the striding dimension (meaning that the address is incremented by the stride in the corresponding striding dimension). The rollover of the counter for a striding dimension increments the counter of the next higher striding dimension. Hence, adding a striding dimension is analogous to adding an outer loop in a loopnest.

For instance, suppose the first striding dimension D1 has a stride of S1 and a repetition of N1, the second striding dimension D2 has a stride of S2 and a repetition of N2, the third striding dimension D3 has a stride of S3 and a repetition of N3, and the fourth striding dimension D4 has a stride of S4 and a repetition of N4. Given a starting address, the address for each of the tensorized memory descriptors can be computed according to the pseudocode:

```
for (z=0; z<N4; z=z+1) {
  for (y=0; y<N3; y=y+1) {
    for (x=0; x<N2; x=x+1) {
      for (w=0; w<N1; w=w+1) { address=starting_address+(w*S1)+(x*S2)+(y*S3)+
          (z*S4);}}}}
```

Using this striding configuration, a set of tensorized memory descriptors can be generated from the tensorized template descriptor 654-1. A set of counters can be implemented for the loop indices, and adders can be implemented to perform the address increments as each count increments.

In some implementations, to facilitate the processing of descriptor packet 650-1, the first descriptor being tensorized header descriptor 652-1 may include a first position indicator bit to indicate that tensorized header descriptor 652-1 is the first descriptor in the descriptor packet 650-1. The last descriptor of descriptor packet 650-1 being the tensorized template descriptor 654-1 may include a last position indicator bit to indicate tensorized template 654-1 is the last descriptor of the descriptor packet 650-1. The first descriptor being tensorized header descriptor 652-1 may also include information indicating the length of the descriptor packet 650-1, the number of tensorized memory descriptors to be generated, the total amount of data being transferred by the descriptor packet 650-1, etc. This information can be used, for example, to allocate sufficient space in the data buffer of the DMA engine to store the data obtained by the DMA engine using the tensorized memory descriptors, or to request sufficient data in the data buffer to provide the DMA engine with data to transfer using the tensorized memory descriptors.

Figure 7:
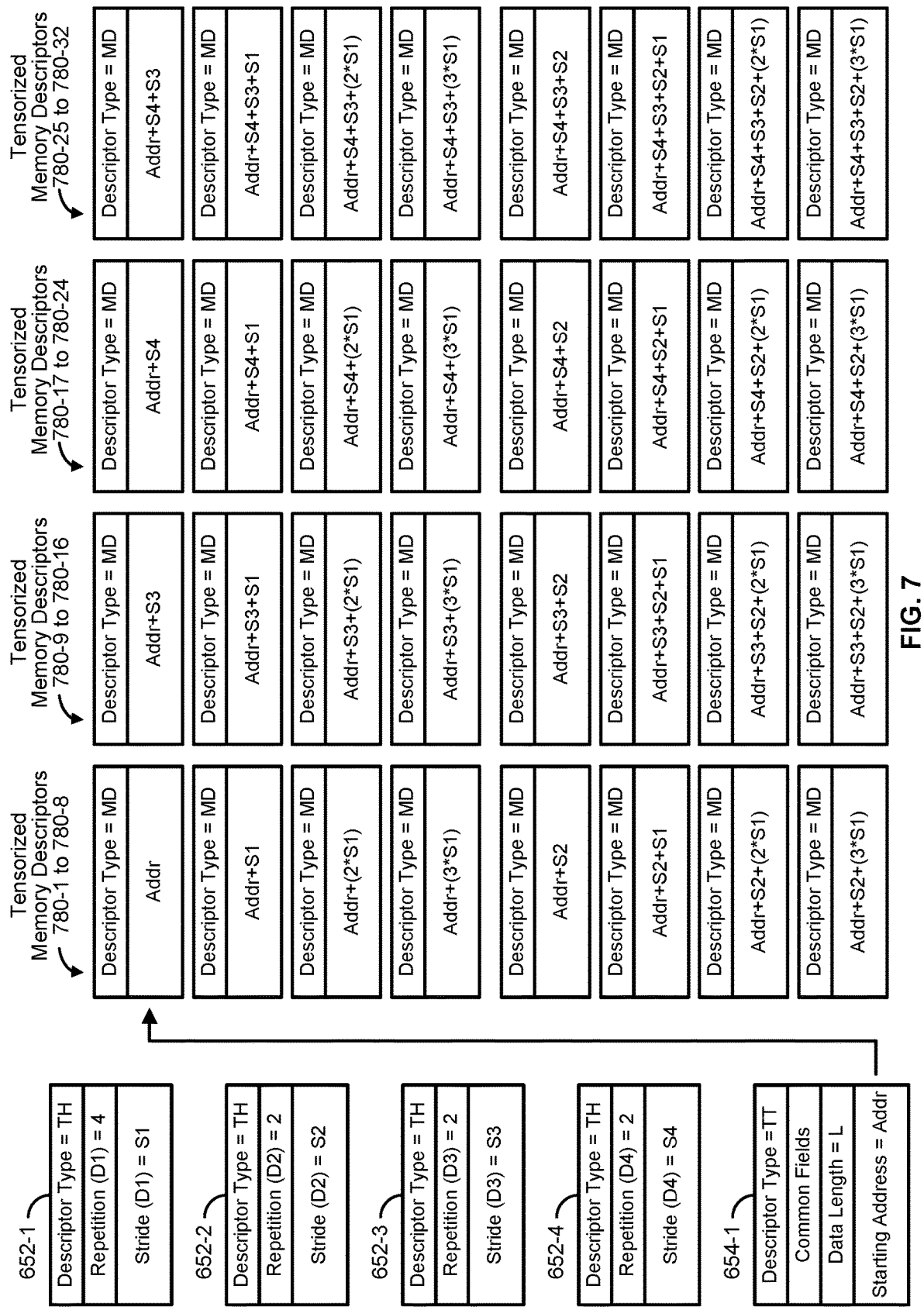
FIG. 7 illustrates a conceptual diagram of another example of processing a descriptor packet.

FIG. 7 illustrates a conceptual diagram of an example of processing a descriptor packet with multidimensional striding (e.g., descriptor packet 650-1). As described above, a descriptor packet 650-1 may include four tensorized header descriptors 652-1 to 652-4 and a tensorized template descriptor 654-1. The example shown in FIG. 7 generates tensorized memory descriptors 780-1 to 780-32, which may correspond to the access pattern of the memory layout 500 shown in FIG. 5.

Each of the four tensorized header descriptors 652-1 to 652-4 may include a descriptor type to identify each of them as a tensorized header (TH) descriptor. Tensorized header descriptor 652-1 includes a repetition number field to indicate the number of times to repeat striding in the first striding dimension D1, and a stride field to indicate a stride to offset the address for each successive memory descriptor being generated. Referring to memory layout 500, the stride along the D1 striding dimension is S1 and the repetition number is 4, because each row of a tensor contains four data elements spaced apart at stride S1. Tensorized header descriptor 652-2 contains the striding information for the second striding dimension D2. Referring to memory layout 500, the stride along the D2 striding dimension is S2 and the repetition number is 2, because each tensor contains two rows spaced apart at stride S2. Tensorized header descriptor 652-3 contains the striding information for the third striding dimension D3. Referring to memory layout 500, the stride along the D3 striding dimension is S3 and the repetition number is 2, because there are two tensors that are spaced apart at stride S3 along the D3 direction. Tensorized header descriptor 652-4 contains the striding information for the fourth striding dimension D4. Referring to memory layout 500, the stride along the D4 striding dimension is S4 and the repetition number is 2, because there are two tensors that are spaced apart at stride S4 along the D4 direction.

Tensorized template descriptor 654-1 may include a descriptor type to identify tensorized template descriptor 654-1 as a tensorized template (TT) descriptor. Tensorized template descriptor 654-1 may have a structure and fields that resemble those of a normal memory descriptor. For example, tensorized template descriptor 654-1 may include a data length field to indicate the data transfer size requested by a memory descriptor, and an address field with a starting address indicating the address of the first tensorized memory descriptor generated from the tensorized template descriptor 654-1. In addition, tensorized template descriptor 654-1 may include a set of common fields that are common to all the tensorized memory descriptors being generated from the tensorized template descriptor 654-1.

Given the striding configuration obtained from the tensorized header descriptors 652-1 to 652-4 and the memory descriptor template of the tensorized template descriptor 654-1, a series of tensorized memory descriptors 780-1 to 780-32 can be generated. It should be noted that although the common fields and the data length fields have been omitted from tensorized memory descriptors 780-1 to 780-32 in FIG. 7 for ease of illustration, each of tensorized memory descriptors 780-1 to 780-32 contains the common fields and the data length provided in tensorized template descriptor 654-1.

The descriptor processing circuit (e.g., Tx descriptor processing circuit 214, Rx descriptor processing circuit 264) of a DMA engine may retrieve the first descriptor from descriptor packet 650-1, and determine that the first descriptor is a first tensorized header descriptor 652-1 based on the descriptor type. In response to determining that this is the first tensorized header descriptor 652-1, the descriptor processing circuit can set the striding configuration to generate addresses at stride S1 in the first striding dimension D1 for a repetition number of 4 times as indicated in tensorized header descriptor 652-1. The descriptor processing circuit may retrieve the second descriptor, and determine that the second descriptor is a second tensorized header descriptor 652-2 based on the descriptor type. In response to determining that this is the second tensorized header descriptor 652-2, the descriptor processing circuit can add a second striding dimension to the striding configuration, such that the striding configuration is now set to generate addresses at stride S1 in the first striding dimension D1 for a repetition number of 4 times, and at stride S2 in the second striding dimension D2 for a repetition number of 2 times as indicated in tensorized header descriptor 652-2.

The descriptor processing circuit may retrieve the third descriptor, and determine that the third descriptor is a third tensorized header descriptor 652-3 based on the descriptor type. In response to determining that this is the third tensorized header descriptor 652-3, the descriptor processing circuit can add a third striding dimension to the striding configuration, such that the striding configuration is now set to generate addresses at stride S1 in the first striding dimension D1 for a repetition number of 4 times, at stride S2 in the second striding dimension D2 for a repetition number of 2 times, and at stride S3 in the third striding dimension D3 for a repetition number of 2 times as indicated in tensorized header descriptor 652-3. The descriptor processing circuit may retrieve the fourth descriptor, and determine that the fourth descriptor is a fourth tensorized header descriptor 652-4 based on the descriptor type. In response to determining that this is the fourth tensorized header descriptor 652-4, the descriptor processing circuit can add a fourth striding dimension to the striding configuration, such that the striding configuration is now set to generate addresses at stride S1 in the first striding dimension D1 for a repetition number of 4 times, at stride S2 in the second striding dimension D2 for a repetition number of 2 times, at stride S3 in the third striding dimension D3 for a repetition number of 2 times, and at stride S4 in the fourth striding dimension D4 for a repetition number of 2 times as indicated in tensorized header descriptor 652-4.

The descriptor processing circuit may retrieve the next descriptor from the descriptor queue, and determine that the next descriptor is a tensorized template descriptor 654-1. In response to determining that the descriptor is a tensorized template descriptor, the descriptor processing circuit can start generating a set of tensorized memory descriptors based on the striding configuration using the starting address and the data transfer size provided in the tensorized template descriptor 654-1. For example, to generate tensorized memory descriptor 680-1, the descriptor processing circuit can use tensorized template descriptor 654-1 as a template, and modify the descriptor type to indicate a memory descriptor. The data length field and other common fields of tensorized memory descriptor 780-1 can remain the same as tensorized template descriptor 654-1. The first tensorized memory descriptor being generated from a tensorized template descriptor uses the starting address in the tensorized template descriptor as the address provided in the memory descriptor. Hence, the starting address provided in tensorized template descriptor 654-1 is used as the address for tensorized memory descriptor 780-1. Tensorized memory descriptor 780-1 is the first of four tensorized memory descriptors 780-1 to 780-4 generated with addresses having a stride of S1 in the D1 striding dimension. The four tensorized memory descriptors 780-1 to 780-4 corresponds to the four iterations in the D1 striding dimension. This set of tensorized memory descriptors 780-1 to 780-4 corresponds to the first of two iterations in the D2 striding dimension.

The next tensorized memory descriptor 780-5 is generated by offsetting the starting address with stride S2 in the D2 striding dimension. Tensorized memory descriptor 780-5 is the first of four tensorized memory descriptors 780-5 to 780-8 generated with addresses having a stride of S1 in the D1 striding dimension. This set of tensorized memory descriptors 780-5 to 780-8 corresponds to the second iteration in the D2 striding dimension. This set of tensorized memory descriptors 780-1 to 780-8 corresponds to the first of two iterations in the D3 striding dimension. This set of tensorized memory descriptors 780-1 to 780-8 also corresponds to tensor T1 502 in memory layout 500.

The next tensorized memory descriptor 780-9 is generated by offsetting the starting address with stride S3 in the D3 striding dimension. Tensorized memory descriptors 780-9 to 780-16 are generated in a similar manner as tensorized memory descriptors 780-1 to 780-8. The set of tensorized memory descriptors 780-9 to 780-16 corresponds to the second iteration in the D3 striding dimension. This set of tensorized memory descriptors 780-9 to 780-16 also corresponds to tensor T2 504 in memory layout 500. The set of tensorized memory descriptors 780-1 to 780-16 corresponds to the first of two iterations in the D4 striding dimension.

The next tensorized memory descriptor 780-17 is generated by offsetting the starting address with stride S4 in the D4 striding dimension. Tensorized memory descriptors 780-17 to 780-32 are generated in a similar manner as tensorized memory descriptors 780-1 to 780-16. The set of tensorized memory descriptors 780-17 to 780-32 corresponds to the second iteration in the D4 striding dimension. Tensorized memory descriptors 780-17 to 780-24 corresponds to tensor T3 506 in memory layout 500, and tensorized memory descriptors 780-25 to 780-32 corresponds to tensor T4 508 in memory layout 500.

As shown in FIG. 7, the addresses generated from the descriptor packet 650-1 corresponds to the loopnest pseudocode above. By using four tensorized header descriptors to provide striding information for four striding dimensions, 32 tensorized memory descriptors can be generated from a single tensorized template descriptor. The total number of descriptors being generated is based on the repetition numbers of the respective striding dimensions, which are as 4×2×2×2=32. Hence, hundreds and thousands of tensorized memory descriptors can be generated with addresses having multidimensional strides by increasing the repetition numbers. It should also be noted that although four striding dimensions have been described, fewer or more striding dimensions can be used by decreasing or increasing the number of sequential tensorized header descriptors in the descriptor packet, with each tensorized header descriptor corresponding to one striding dimension.

Figure 8:
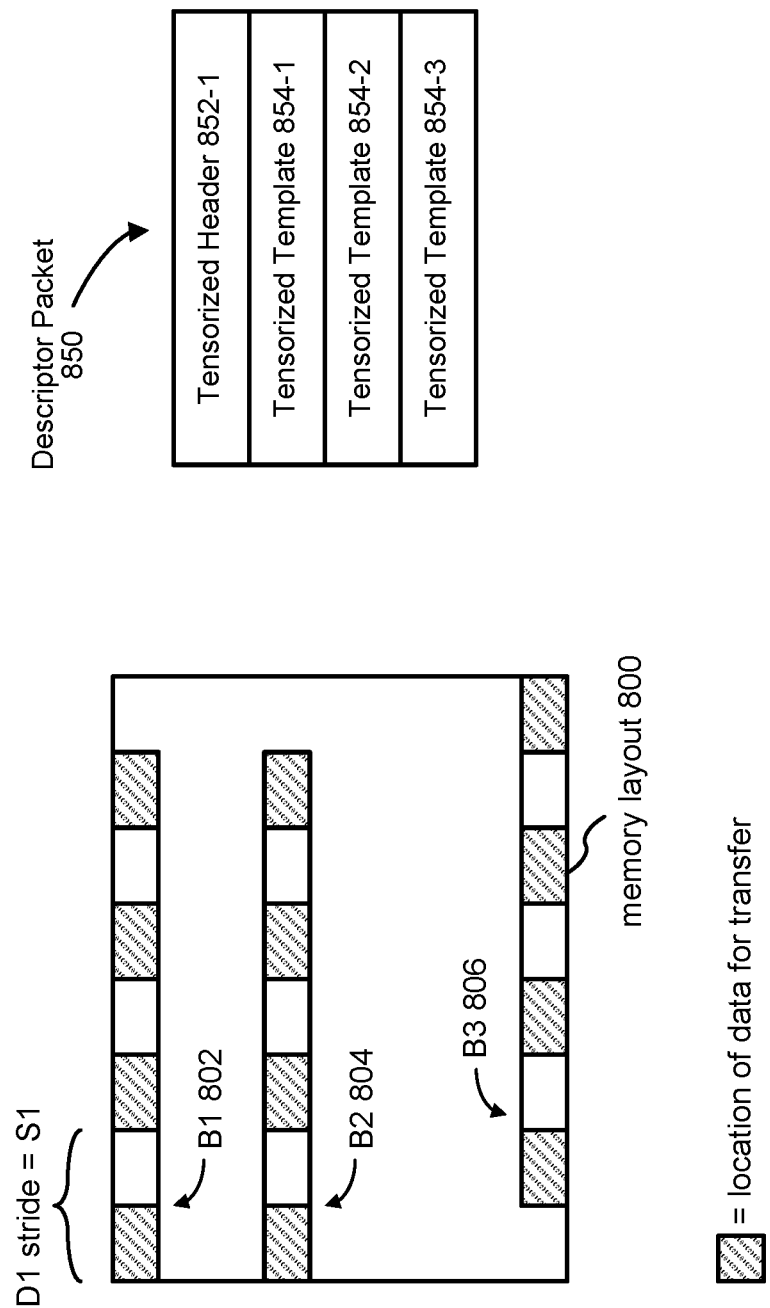
FIG. 8 illustrates a further example of data blocks in a memory layout and a further example of a descriptor packet.

In some scenarios, the memory access pattern at the higher striding dimensions may have a non-uniform stride. FIG. 8 illustrates an example of a memory layout 800 for data blocks with a non-uniform stride. In the example shown, three data blocks that each contains four data elements can be arranged in memory as indicated by the cells with the diagonal fill pattern. Data block B1 802 may include four data elements arranged in a row, with the data elements being spaced apart by a stride of S1 in the first dimension (D1). Each of data block B2 504 and data block B3 506 also has four data elements spaced apart by a stride of S1 in the D1 striding dimension. However, the stride distance between data block B1 802 to data block B2 804 is different than the stride distance between data block B2 804 to data block B3 806. Hence, adding an additional striding dimension may not be able to generate the tensorized memory descriptors to transfer the three data blocks. Nevertheless, a descriptor packet with multiple tensorized template descriptors can be used to generate tensorized memory descriptors in such scenarios. For example, a descriptor packet 850 with one tensorized header descriptor 852-1 followed by three tensorized template descriptors 854-1 to 854-3 can be used to generate tensorized memory descriptors to transfer the three data blocks in memory layout 800.

Figure 9:
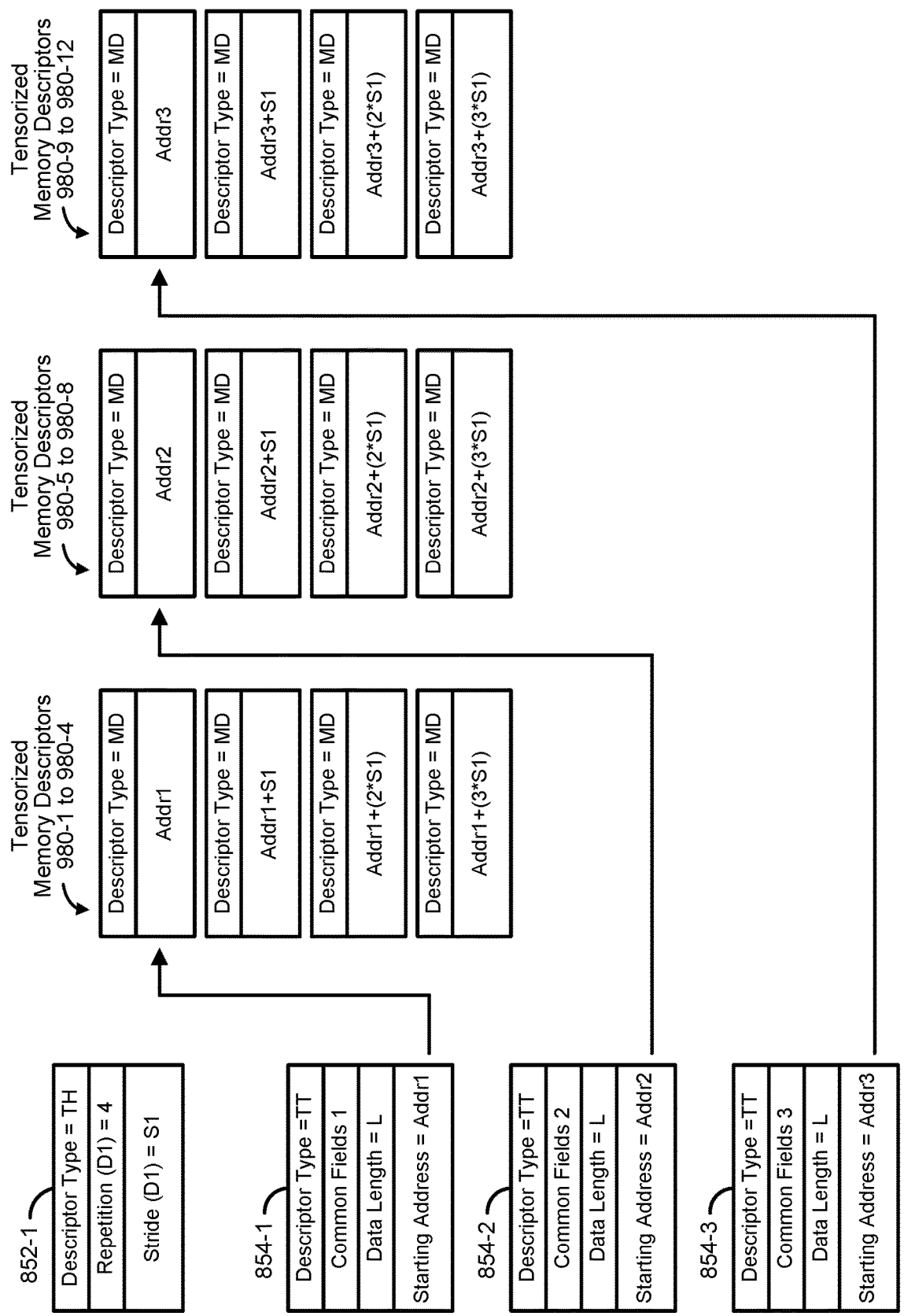
FIG. 9 illustrates a conceptual diagram of a further example of processing a descriptor packet.

FIG. 9 illustrates a conceptual diagram of an example of processing a descriptor packet for data blocks with non-uniform striding (e.g., descriptor packet 850). As described above, a descriptor packet 850 may include one tensorized header descriptor 852-1 followed by three tensorized template descriptors 854-1 to 854-3. The example shown in FIG. 9 generates tensorized memory descriptors 980-1 to 980-12, which may correspond to the access pattern of the memory layout 800 shown in FIG. 8.

Tensorized header descriptor 852-1 may include a descriptor type to identify the descriptor as a tensorized header (TH) descriptor. Tensorized header descriptor 852-1 includes a repetition number field to indicate the number of times to repeat striding in the first striding dimension D1, and a stride field to indicate a stride to offset the address for each successive memory descriptor being generated. Referring to memory layout 800, the stride along the D1 striding dimension is S1 and the repetition number is 4, because there are four data elements spaced apart at stride S1.

Tensorized template descriptor 854-1 may include a descriptor type to identify tensorized template descriptor 854-1 as a tensorized template (TT) descriptor. Tensorized template descriptor 854-1 may have a structure and fields that resemble those of a normal memory descriptor. For example, tensorized template descriptor 854-1 may include a data length field to indicate the data transfer size requested by a memory descriptor, and an address field with a starting address indicating the address of the first tensorized memory descriptor generated from the tensorized template descriptor 854-1. The starting address Addr1 may correspond to the starting address of data block B1 802. In addition, tensorized template descriptor 854-1 may include a set of common fields that are common to all the tensorized memory descriptors being generated from the tensorized template descriptor 854-1.

Tensorized template descriptors 854-2 and 854-3 are each similar to tensorized template descriptor 854-1, but may contain different starting addresses. The starting address of Addr2 provided in tensorized template descriptor 854-2 may corresponding to the starting address of data block B2 804. The starting address of Addr3 provided in tensorized template descriptor 854-3 may corresponding to the starting address of data block B3 806.

Given the striding configuration obtained from the tensorized header descriptor 852-1, a set of tensorized memory descriptors can be generated for each of the three tensorized template descriptors 854-1 to 854-3. It should be noted that although the common fields and the data length fields have been omitted from tensorized memory descriptors 980-1 to 980-12 for ease of illustration, each of tensorized memory descriptors 980-1 to 980-12 contains the common fields and the data length provided in their respective tensorized template descriptor.

The descriptor processing circuit (e.g., Tx descriptor processing circuit 214, Rx descriptor processing circuit 264) of a DMA engine may retrieve the first descriptor from descriptor packet 850, and determine that the first descriptor is a tensorized header descriptor 852-1 based on the descriptor type. In response to determining that this is the first tensorized header descriptor 852-1, the descriptor processing circuit can set the striding configuration to generate addresses at stride S1 in the first striding dimension D1 for a repetition number of 4 times as indicated in tensorized header descriptor 852-1.

The descriptor processing circuit may retrieve the next descriptor from the descriptor queue, and determine that the next descriptor is a tensorized template descriptor 854-1. In response to determining that the descriptor is a tensorized template descriptor, the descriptor processing circuit can start generating a set of tensorized memory descriptors based on the striding configuration using the starting address and the data transfer size provided in the tensorized template descriptor 854-1. For example, to generate tensorized memory descriptor 980-1, the descriptor processing circuit can use tensorized template descriptor 854-1 as a template, and modify the descriptor type to indicate a memory descriptor. The starting address Addr1 provided in tensorized template descriptor 854-1 is used as the address for tensorized memory descriptor 980-1. Tensorized memory descriptor 980-1 is the first of four tensorized memory descriptors 980-1 to 980-4 generated with addresses having a stride of S1 in the D1 striding dimension. The four tensorized memory descriptors 980-1 to 980-4 corresponds to the four iterations in the D1 striding dimension, and corresponds to data block B1 802.

The descriptor processing circuit may retrieve the next descriptor from the descriptor queue, and determine that the next descriptor is also a tensorized template descriptor

854-2. In response to determining that the descriptor is a tensorized template descriptor, the descriptor processing circuit can start generating a set of tensorized memory descriptors based on the same striding configuration as above, but using the starting address and the data transfer size provided in the tensorized template descriptor 854-2. The starting address Addr2 provided in tensorized template descriptor 854-2 is used as the address for tensorized memory descriptor 980-5. Tensorized memory descriptor 980-5 is the first of four tensorized memory descriptors 980-5 to 980-8 generated with addresses having a stride of S1 in the D1 striding dimension. The four tensorized memory descriptors 980-5 to 980-8 corresponds to the four iterations in the D1 striding dimension, and corresponds to data block B2 804.

The descriptor processing circuit may retrieve the next descriptor from the descriptor queue, and determine that the next descriptor is another tensorized template descriptor 854-3. In response to determining that the descriptor is a tensorized template descriptor, the descriptor processing circuit can start generating a set of tensorized memory descriptors based on the same striding configuration as above, but using the starting address and the data transfer size provided in the tensorized template descriptor 854-3. The starting address Addr3 provided in tensorized template descriptor 854-3 is used as the address for tensorized memory descriptor 980-9. Tensorized memory descriptor 980-9 is the first of four tensorized memory descriptors 980-9 to 980-12 generated with addresses having a stride of S1 in the D1 striding dimension. The four tensorized memory descriptors 980-9 to 980-12 corresponds to the four iterations in the D1 striding dimension, and corresponds to data block B3 806.

Accordingly, by providing sequential tensorized template descriptors, multiple sets of tensorized memory descriptors can be generated from different respective starting addresses. Each set of tensorized memory descriptors can be generated with the same striding configuration without having to process separate tensorized header descriptor for each of the tensorized template descriptor. In other words, the striding configuration can be set once, and the same striding configuration can be used to generate multiple sets of tensorized memory descriptors. It should also be noted that although the example striding configuration in FIG. 8 has only one stride dimension, a striding configuration with multiple striding dimensions can also be implemented with multiple tensorized template descriptors preceding the sequential tensorized template descriptors. In other words, although the data blocks in FIG. 8 each has only one striding dimension, the same technique to transfer multiple data blocks can be applied to transferring multiple data blocks that each have multidimensional strides.

Figure 10:
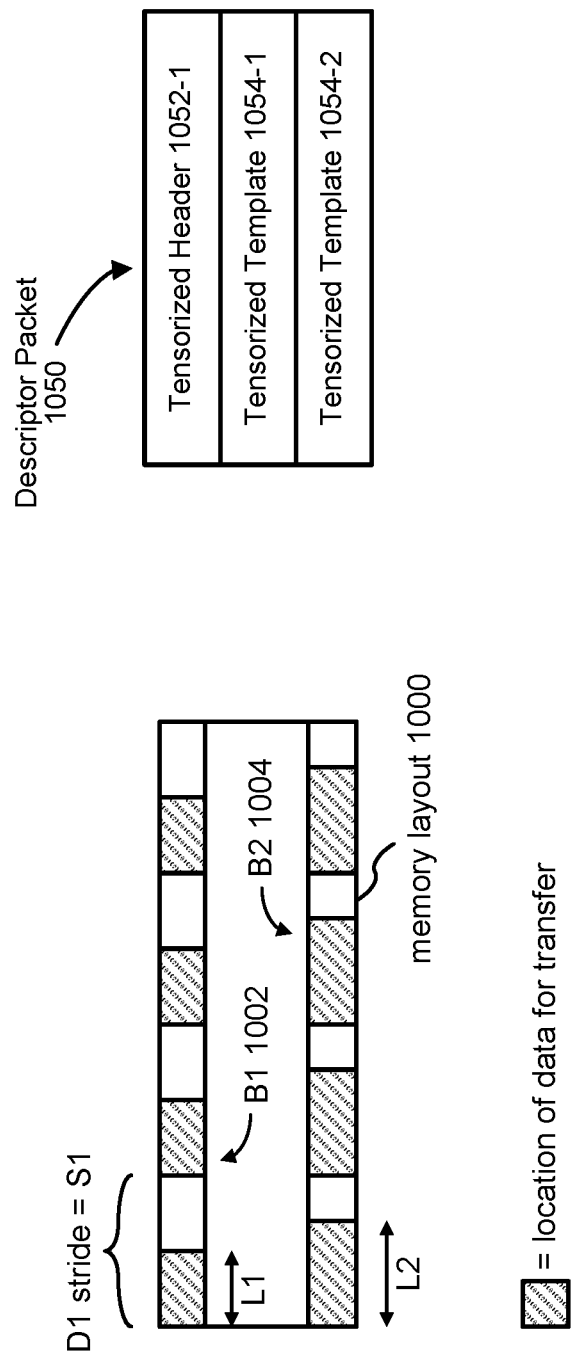
FIG. 10 illustrates an additional example of data blocks in a memory layout and an additional example of a descriptor packet.

In some scenarios, the memory access pattern may transfer data of different lengths but with the same striding configuration. FIG. 10 illustrates an example of a memory layout 1000 for data blocks having the same. In the example shown, two data blocks that each contains four data elements can be arranged in memory as indicated by the cells with the diagonal fill pattern. Data block B1 1002 may include four data elements arranged in a row, with the data elements being spaced apart by a stride of S1 in the first dimension (D1). Data block B2 1004 may also include four data elements arranged in a row, with the data elements being spaced apart by a stride of S1 in the first dimension (D1). However, the data elements in data block B1 1002 each has a data length of L1, and the data elements in data block B2 1004 each has a data length of L2. A descriptor packet with multiple tensorized template descriptors can be used to generate tensorized memory descriptors with different data lengths but the same stride configuration in such scenarios. For example, a descriptor packet 1050 with one tensorized header descriptor 1052-1 followed by two tensorized template descriptors 1054-1 to 1054-2 can be used to generate tensorized memory descriptors to transfer the two data blocks in memory layout 1000.

Figure 11:
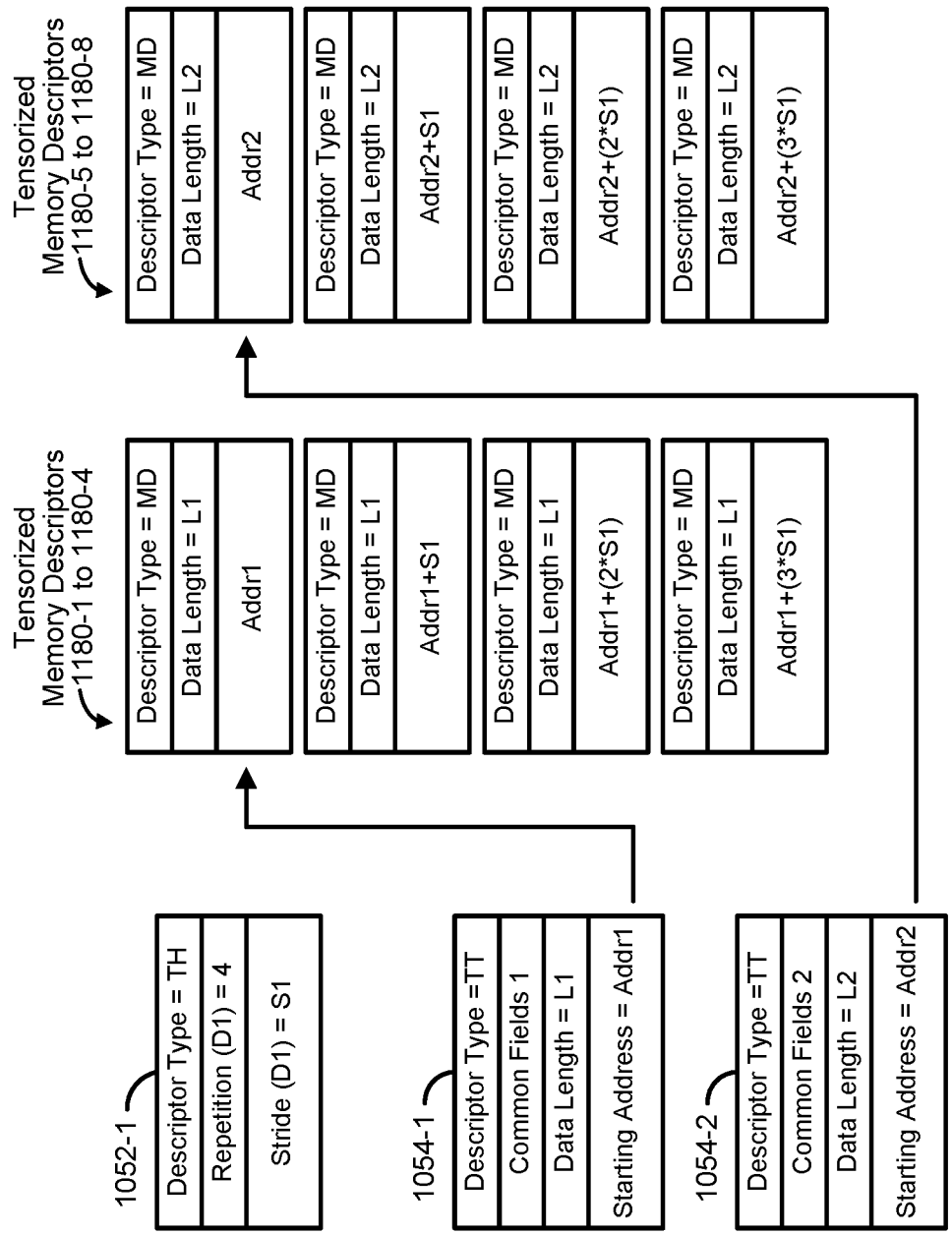
FIG. 11 illustrates a conceptual diagram of an additional example of processing a descriptor packet.

FIG. 11 illustrates a conceptual diagram of an example of processing a descriptor packet to generate tensorized descriptors with different data lengths (e.g., descriptor packet 1050). As described above, a descriptor packet 1050 may include one tensorized header descriptor 1052-1 followed by two tensorized template descriptors 1054-1 to 1054-2. The example shown in FIG. 11 generates tensorized memory descriptors 1180-1 to 1180-8, which may correspond to the access pattern of the memory layout 1000 shown in FIG. 10.

Tensorized header descriptor 1052-1 may include a descriptor type to identify the descriptor as a tensorized header (TH) descriptor. Tensorized header descriptor 1052-1 includes a repetition number field to indicate the number of times to repeat striding in the first striding dimension D1, and a stride field to indicate a stride to offset the address for each successive memory descriptor being generated. Referring to memory layout 1000, the stride along the D1 striding dimension is S1 and the repetition number is 4, because there are four data elements spaced apart at stride S1.

Tensorized template descriptor 1054-1 may include a descriptor type to identify tensorized template descriptor 1054-1 as a tensorized template (TT) descriptor. Tensorized template descriptor 1054-1 may have a structure and fields that resemble those of a normal memory descriptor. For example, tensorized template descriptor 1054-1 may include a data length field to indicate the data transfer size requested by a memory descriptor, and an address field with a starting address indicating the address of the first tensorized memory descriptor generated from the tensorized template descriptor 1054-1. The starting address Addr1 may correspond to the starting address of data block B1 1002, and the data length L1 may correspond to the length of the data elements in data block B1 1002. In addition, tensorized template descriptor 1054-1 may include a set of common fields that are common to all the tensorized memory descriptors being generated from the tensorized template descriptor 1054-1.

Tensorized template descriptor 1054-2 may have a similar structure as tensorized template descriptor 1054-1. The starting address Addr2 may correspond to the starting address of data block B2 1004, and the data length L2 may correspond to the length of the data elements in data block B2 1004. In addition, tensorized template descriptor 1054-2 may include a set of common fields that are common to all the tensorized memory descriptors being generated from the tensorized template descriptor 1054-2.

The descriptor processing circuit (e.g., Tx descriptor processing circuit 214, Rx descriptor processing circuit 264) of a DMA engine may retrieve the first descriptor from descriptor packet 1050, and determine that the first descriptor is a tensorized header descriptor 1052-1 based on the descriptor type. In response to determining that this is the first tensorized header descriptor 1052-1, the descriptor processing circuit can set the striding configuration to generate addresses at stride S1 in the first striding dimension D1 for a repetition number of 4 times as indicated in tensorized header descriptor 1052-1.

The descriptor processing circuit may retrieve the next descriptor from the descriptor queue, and determine that the next descriptor is a tensorized template descriptor 1054-1. In response to determining that the descriptor is a tensorized template descriptor, the descriptor processing circuit can start generating a set of tensorized memory descriptors based on the striding configuration using the starting address and the data transfer size provided in the tensorized template descriptor 1054-1. For example, to generate tensorized memory descriptor 1080-1, the descriptor processing circuit can use tensorized template descriptor 1054-1 as a template, and modify the descriptor type to indicate a memory descriptor. The starting address Addr1 provided in tensorized template descriptor 1054-1 is used as the address for tensorized memory descriptor 1180-1, and the data length L1 provided in tensorized template descriptor 1054-1 is used as the data length for tensorized memory descriptor 1180-1. Tensorized memory descriptor 1180-1 is the first of four tensorized memory descriptors 1180-1 to 1180-4 generated with addresses having a stride of S1 in the D1 striding dimension, and a data length of L1. The four tensorized memory descriptors 1180-1 to 1180-4 corresponds to the four iterations in the D1 striding dimension, and corresponds to data block B1 1002.

The descriptor processing circuit may retrieve the next descriptor from the descriptor queue, and determine that the next descriptor is also a tensorized template descriptor 1054-2. In response to determining that the descriptor is a tensorized template descriptor, the descriptor processing circuit can start generating a set of tensorized memory descriptors based on the same striding configuration as above, but using the starting address and the data transfer size provided in the tensorized template descriptor 1054-2. The starting address Addr2 provided in tensorized template descriptor 1054-2 is used as the address for tensorized memory descriptor 1180-5, and the data length L2 provided in tensorized template descriptor 1054-2 is used as the data length for tensorized memory descriptor 1180-5. Tensorized memory descriptor 1180-5 is the first of four tensorized memory descriptors 1180-5 to 1180-8 generated with addresses having a stride of S1 in the D1 striding dimension, and data length of L2. The four tensorized memory descriptors 1180-5 to 1180-8 corresponds to the four iterations in the D1 striding dimension, and corresponds to data block B2 1004.

Accordingly, by providing sequential tensorized template descriptors, multiple sets of tensorized memory descriptors can be generated from different respective starting addresses and each set of tensorized memory descriptors can be generated with a different data length. Each set of tensorized memory descriptors can be generated with the same striding configuration without having to process separate tensorized header descriptor for each of the tensorized template descriptor. In other words, the striding configuration can be set once, and the same striding configuration can be used to generate multiple sets of tensorized memory descriptors. It should also be noted that although the example striding configuration in FIG. 10 has only one stride dimension, a striding configuration with multiple striding dimensions can also be implemented with multiple tensorized template descriptors preceding the sequential tensorized template descriptors. In other words, although the data blocks in FIG. 10 each has only one striding dimension, the same technique to transfer multiple data blocks with different data lengths can be applied to transferring multiple data blocks that each have multidimensional strides.

Figure 12:
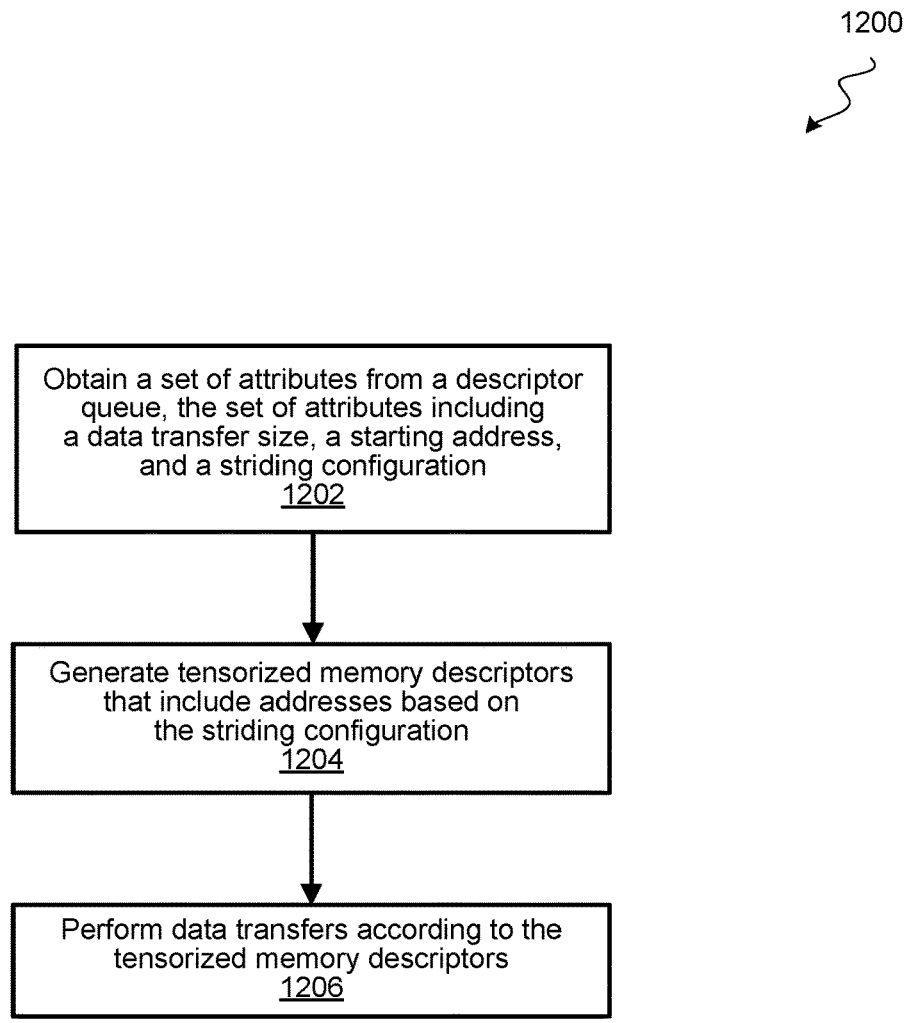
FIG. 12 illustrates a flow diagram of an example of a process to generate memory descriptors.

FIG. 12 illustrates a flow diagram of an example of a process 1200 to generate tensorized memory descriptors by a DMA engine. Process 1200 can be performed, for example, by DMA circuitry such as descriptor processing circuitry (e.g., Tx descriptor processing circuit 214, Rx descriptor processing circuit 264). Process 1200 may begin at block 602 by obtaining a set of attributes from a descriptor queue. The set of attributes may include a data transfer size (e.g., a data length), a starting address, and a striding configuration. The striding configuration may include striding information for one or more striding dimensions. The striding information for each striding dimension may include a stride (e.g., an address offset value) and a repetition number indicating a number of times to repeat striding in the corresponding striding dimension. The stride can be defined using a number of bits sufficient to span multiple components of a computing system (e.g., multiple accelerators). In some implementations, the stride can be defined using a number of bits sufficient to span the entire address range of the computing system.

The set of attributes can be obtained, for example, from descriptors stored in the descriptor queue. The descriptors can be packetized into a descriptor packet. The descriptor packet may include at least one tensorized header descriptor to provide striding information, and at least one tensorize template descriptor to provide a starting address and a data transfer size. In some implementations, one or more tensorized template descriptors may follow one or more tensorized header descriptors in the descriptor packet.

The striding configuration can be obtained from one or more tensorized header descriptors retrieved from the descriptor queue. For example, if a data transfer uses only one striding dimension, the striding configuration can be obtained from one tensorized header descriptor. As another example, the descriptor packet may contain a set of tensorized header descriptors including a tensorized header descriptor for each striding dimension of multiple striding dimensions. Each tensorized header descriptor may contain the striding information for one of the multiple striding dimensions. The set of tensorizes header descriptors can be obtained sequentially from the descriptor queue, and each successive tensorized header descriptor can provide the striding information for a higher striding dimension. Each tensorized header descriptor can be processed by adding a striding dimension to the striding configuration such that each sequential tensorized header descriptor adds a higher striding dimension to the striding configuration.

The data transfer size and starting address can be obtained from a tensorized template descriptor retrieved from the descriptor queue. The tensorized template descriptor may also include a set of common fields (e.g., operation type, datatype, etc.) that are included in each tensorized memory descriptor being generated from the tensorized template descriptor. The tensorized header descriptor and/or the tensorized template descriptor may include other fields not specifically described.

At block 1204, tensorized memory descriptors can be generated based on the set of attributes. For example, a tensorized template descriptor can be used as a base memory descriptor from which the tensorized memory descriptors are generated. The first tensorized memory descriptor generated from a tensorized template descriptor can include the starting address provided in the tensorized template descriptor. The subsequent tensorized memory descriptors generated from the tensorized template descriptor can have addresses derived based on the striding configuration by offsetting the starting address with the stride. For a striding configuration with multidimensional striding, the addresses can be derived based on a multilevel loopnest with each loop representing a striding dimension. The tensorized memory descriptors generated from the tensorized template descriptor may also include the data transfer size and other common fields provided in the tensorized template descriptor.

Multiple sets of tensorized memory descriptors can be generated based on a striding configuration. For multidimensional striding, a set of tensorized memory descriptors can be generated with address offsets in the first striding dimension. Additional sets of tensorized memory descriptors with address offsets in the first striding dimension are iteratively generated in the higher striding dimensions. In other words, two-dimensional striding can be thought of as generating multiple sets of tensorized memory descriptors with one dimensional striding; three-dimensional striding can be thought of as generating multiple sets of tensorized memory descriptors with two-dimensional striding, etc.

In some implementations, multiple sets of tensorized memory descriptors can be generated from respective tensorized template descriptors. For example, sequential tensorized template descriptors having different starting addresses can be processed by generating a set of tensorized memory descriptors for each sequential tensorized template descriptor based on the same striding configuration, in which each set of tensorized memory descriptors being generated uses a different starting address. Sequential tensorized template descriptors having different starting addresses and different data transfer sizes can be processed by generating a set of tensorized memory descriptors for each sequential tensorized template descriptor based on the same striding configuration, in which each set of tensorized memory descriptors being generated uses a different starting address and a different data transfer size.

At block 1206, data transfers can be performed according to the generated tensorized memory descriptors. For example, each tensorized memory descriptor can be provided to a DMA interface to read or write the amount of data indicated by the data transfer size at the address indicated in the corresponding tensorized memory descriptor. In some implementations, the data transfer can start before the full set of tensorized memory descriptors is generated. In other words, the data transfer associated a tensorized memory descriptor can proceed as soon as that tensorized memory descriptor is generated. Hence, data transfer based on a prior tensorized memory descriptor can be performed concurrently with the generation of the next tensorized memory descriptor.

Process 1200 can be used flexibly to effectuate different memory access patterns. For example, a descriptor packet may include, sequentially, a tensorized header descriptor, a first tensorized template descriptor, and a second tensorized template descriptor. The descriptor processing circuitry in the DMA engine can process the descriptor packet by setting the striding configuration to generate addresses at a stride provided in the tensorized header descriptor. A first set of tensorized memory descriptors can be generated based on the striding configuration using a first starting address provided in the first tensorized template descriptor, and a second set of tensorized memory descriptors can be generated based on the same striding configuration using a second starting address provided in the second tensorized template descriptor.

As another example, a descriptor packet that includes, sequentially, a first tensorized header descriptor, a second tensorized header descriptor, and a first tensorized template descriptor. The descriptor processing circuitry in the DMA engine can process the descriptor packet by setting the striding configuration to generate addresses at a first stride in a first dimension and a second stride in a second dimension higher than the first dimension. The first stride being the stride provided in the first tensorized header descriptor, and the second stride being the stride provided in the second tensorized header descriptor. A first set of tensorized memory descriptors can be generated based on the striding configuration using a first starting address provided in the first tensorized template descriptor.

Figure 13:
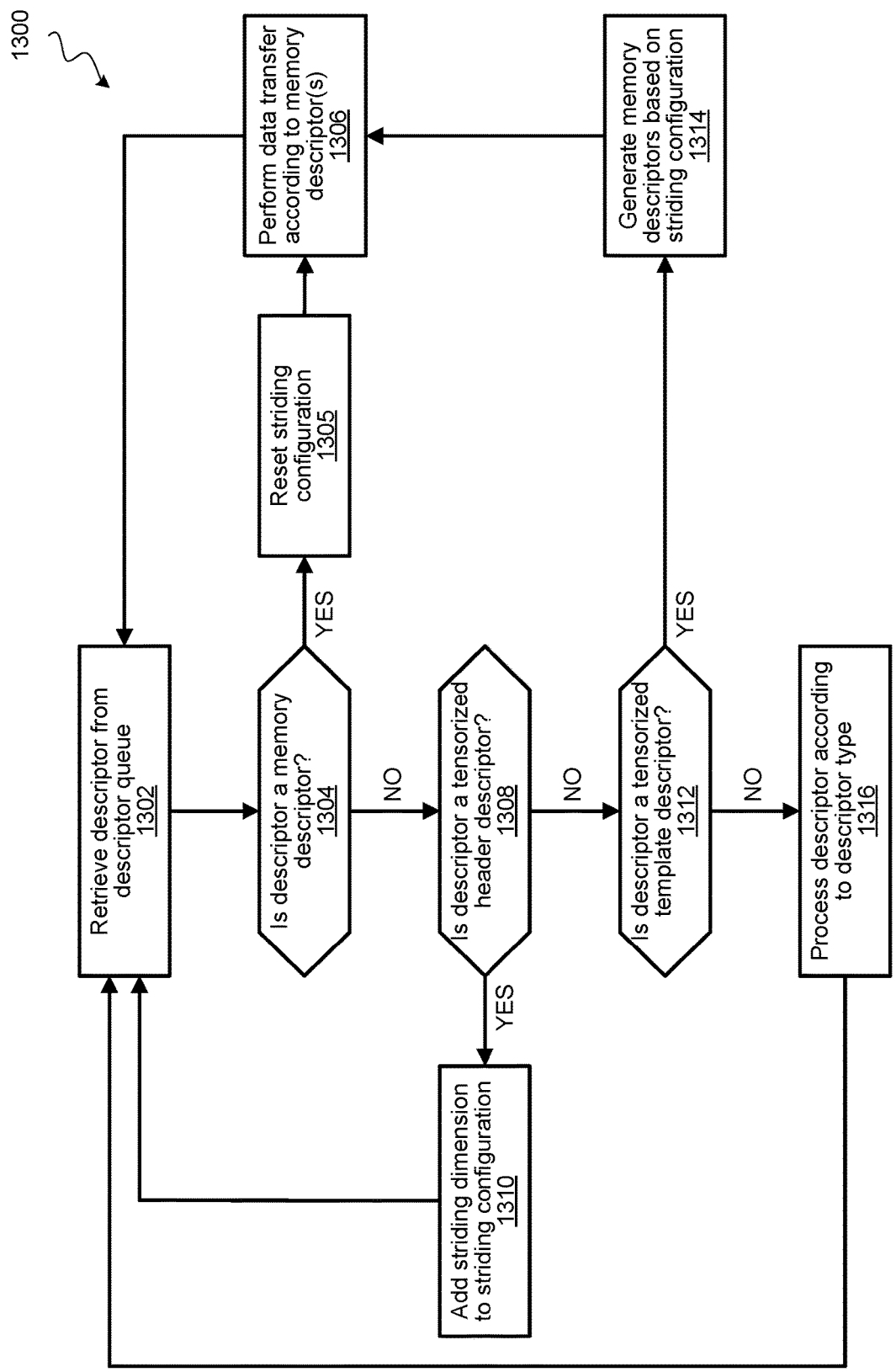
FIG. 13 illustrates a flow diagram of an example of a process for processing descriptors.

If the descriptor packet includes a second tensorized template descriptor following the first tensorized template descriptor, he descriptor processing circuitry in the DMA engine can process the second tensorized template descriptor by generating a second set of tensorized memory descriptors using a second starting address provided in the second tensorized template descriptor. The second set of tensorized memory descriptors can be generated based on the same striding configuration including the first stride in the first dimension and the second stride in the second dimension FIG. 13 illustrates a flow diagram of an example of a process 1300 to process descriptors by a DMA engine. Aspects of process 1300 can be performed, for example, by DMA circuitry such as a descriptor processing circuitry (e.g., Tx descriptor processing circuit 214, Rx descriptor processing circuit 264) of a DMA engine. Process 1300 may begin at block 1302 by retrieving a descriptor from a descriptor queue. At block 1304, a determination is made as to whether the descriptor is a regular memory descriptor. The determination can be made, for example, by parsing the descriptor to obtain the descriptor type of the descriptor. If it is determined that the descriptor is a regular memory descriptor, process 1300 resets the striding configuration to clear out any prior striding information. Process 1300 then proceeds to block 1306 to perform a data transfer according to the memory descriptor, and then returns to block 1302 to obtain the next descriptor from the descriptor queue.

If it is determined that the descriptor is not a regular memory descriptor, a determination is made at block 1308 as to whether the descriptor is a tensorized header descriptor based on the descriptor type provided in the descriptor. If the descriptor is a tensorized header descriptor, a striding dimension is added to the striding configuration at block 1310. For example, the stride and the repetition number to repeat striding in the current striding dimension can be added to the striding configuration. Each sequential tensorized header descriptor may add a higher striding dimension. Thus, the first sequential tensorized header descriptor of a series of tensorized header descriptors may provide the striding information for the first striding dimension, the second tensorized header descriptor may provide the striding information for the second striding dimension, and so on. Upon setting the striding configuration, process 1300 returns to block 1302 to obtain the next descriptor from the descriptor queue.

Referring back to block 1308, if it is determined that the descriptor is not a tensorized header descriptor, a determination is made at block 1312 as to whether the descriptor is a tensorized template descriptor based on the descriptor type provided in the descriptor. If the descriptor is a tensorized template descriptor, a set of tensorized memory descriptors are generated at block 1314. The set of tensorized memory descriptors are generated using the tensorized template descriptor. The first tensorized memory descriptor may include the starting address provided in the tensorized template descriptor, as well as the data transfer size and other common fields provided in the tensorized template descriptor. The addresses included in the subsequent tensorized memory descriptors are derived based on the current striding pattern. Process 1300 proceeds to block 1306 to perform a data transfer according to the generated tensorized memory descriptors, and returns to block 1302 to obtain the next descriptor from the descriptor queue. It should be noted that the data transfer can begin as soon as a tensorized memory descriptor has been generated. In other words, it is not necessary to wait until the full set of tensorized memory descriptors have been generated from the tensorized template descriptor before starting the data transfer. Hence, blocks 1314 and 1306 may overlap with each other, and parts of blocks 1314 and 1306 can be performed in parallel.

Referring back to block 1312, if it is determined that the descriptor is not a tensorized template descriptor, then the descriptor is a different type of descriptor that is not a regular memory descriptor, tensorized header descriptor, or a tensorized template descriptor. In such scenario, process 1300 can proceed to block 1316 to process the descriptor according to its descriptor type. Process 1300 can then return to block 1302 to obtain the next descriptor from the descriptor queue.

Figure 14:
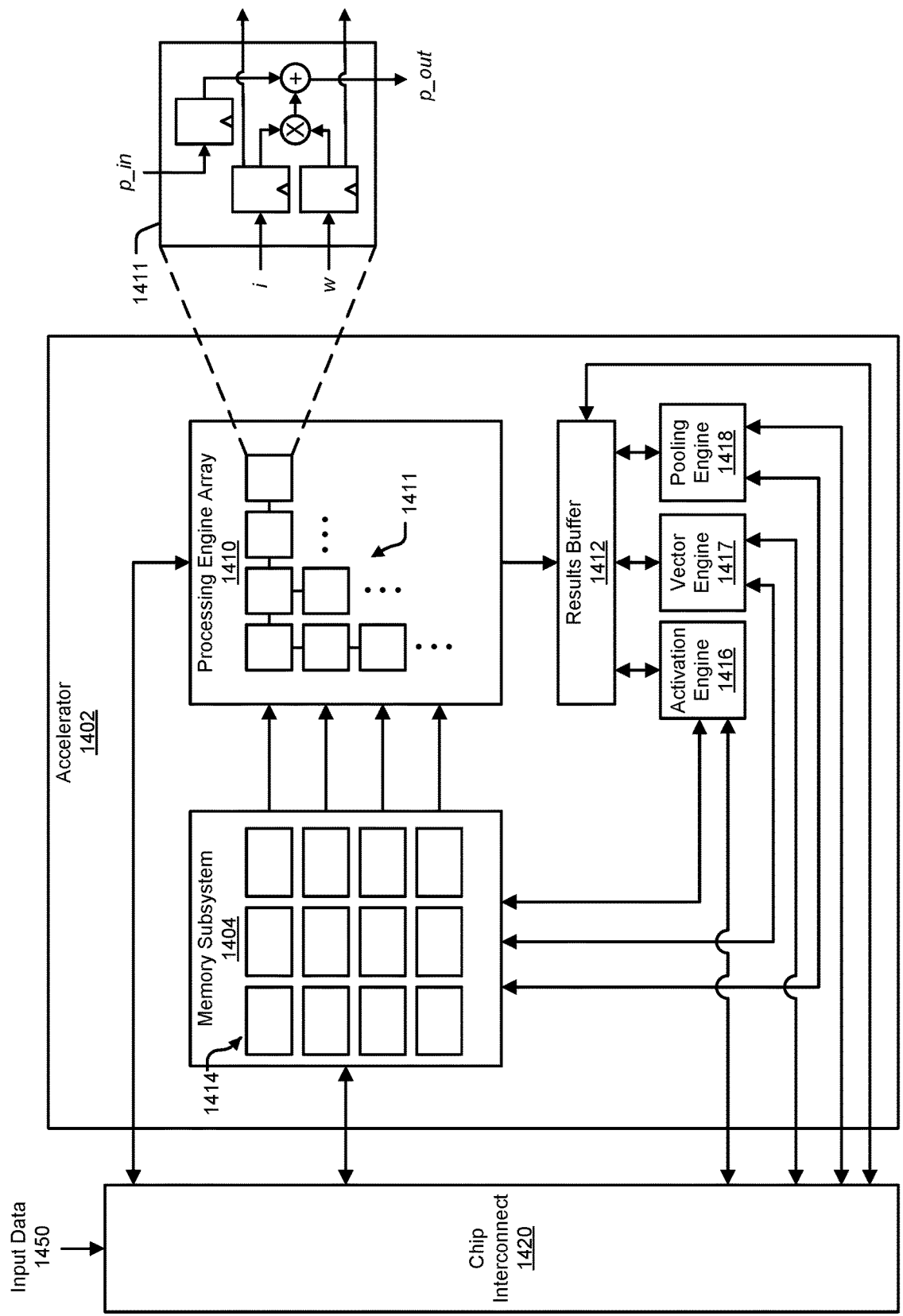
FIG. 14 illustrates a block diagram of an example of an integrated circuit device.

FIG. 14 is a block diagram illustrating an example of an integrated circuit device that can include an accelerator 1402. In various examples, the accelerator 1402, for a set of input data (e.g., input data 1450), can execute computations using a processing engine array 1410, an activation engine 1416, a vector engine 1417, and/or a pooling engine 1418. In some examples, the example accelerator 1402 may be an integrated circuit component of a processor, such as a neural network processor. The processor may have other integrated circuit components, including additional accelerator engines.

In various implementations, the memory subsystem 1404 can include multiple memory banks 1414. Memory subsystem 1404 can also be referred to as a state buffer. In these implementations, each memory bank 1414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1404 can permit simultaneous access to the read or write channels of multiple memory banks. As another example, the memory subsystem 1404 can include arbitration logic such that arbitration between, for example, the outputs of multiple memory banks 1414 can result in more than one memory bank's output being used. In these and other examples, though globally managed by the memory subsystem 1404, each memory bank can be operated independently of any other.

Having the memory banks 1414 be independently accessible can increase the efficiency of the accelerator 1402. For example, values can be simultaneously read and provided to each row of the processing engine array 1410, so that the entire processing engine array 1410 can be in use in one clock cycle. As another example, the memory banks 1414 can be read at the same time that results computed by the processing engine array 1410 are written to the memory subsystem 1404. In contrast, a single memory may be able to service only one read or write at a time. With a single memory, multiple clock cycles can be required, for example, to read input data for each row of the processing engine array 1410 before the processing engine array 1410 can be started.

In various implementations, the memory subsystem 1404 can be configured to simultaneously service multiple clients, including the processing engine array 1410, the activation engine 1416, the vector engine 1417, the pooling engine 1418, and any external clients that access the memory subsystem 1404 over a communication fabric 1420. In some implementations, being able to service multiple clients can mean that the memory subsystem 1404 has at least as many memory banks as there are clients. In some cases, each row of the processing engine array 1410 can count as a separate client. In some cases, each column of the processing engine array 1410 can output a result, such that each column can count as a separate write client. In some cases, output from the processing engine array 1410 can be written into the memory banks 1414 that can then subsequently provide input data for the processing engine array 1410. As another example, the activation engine 1416, the vector engine 1417, and the pooling engine 1418 can include multiple execution channels, each of which can be separate memory clients. The memory banks 1414 can be implemented, for example, using static random access memory (SRAM).

In various implementations, the memory subsystem 1404 can include control logic. The control logic can, for example, keep track of the address spaces of each of the memory banks 1414, identify memory banks 1414 to read from or write to, and/or move data between the memory banks 1414. In some implementations, memory banks 1414 can be hardwired to particular clients. For example, a set of memory banks 1414 can be hardwired to provide values to the rows of the processing engine array 1410, with one memory bank servicing each row. As another example, a set of memory banks can be hard wired to receive values from columns of the processing engine array 1410, with one memory bank receiving data for each column.

The processing engine array 1410 is the computation matrix of the example accelerator 1402. The processing engine array 1410 can, for example, execute parallel integration, convolution, correlation, and/or matrix multiplication, among other things. The processing engine array 1410 includes multiple processing engines 1411, arranged in rows and columns, such that results output by one processing engine 1411 can be input directly into another processing engine 1411. Processing engines 1411 that are not on the outside edges of the processing engine array 1410 thus can receive data to operate on from other processing engines 1411, rather than from the memory subsystem 1404.

In various examples, the processing engine array 1410 uses systolic execution, in which data arrives at each processing engine 1411 from different directions at regular intervals. In some examples, input data can flow into the processing engine array 1410 from the left and weight values can be loaded at the top. In some examples weights and input data can flow from the left and partial sums can flow from top to bottom. In these and other examples, a multiply-and-accumulate operation moves through the processing engine array 1410 as a diagonal wave front, with data moving to the right and down across the array. Control signals can be input at the left at the same time as weights, and can flow across and down along with the computation.

In various implementations, the number of columns in the processing engine array 1410 determines the computational capacity of the processing engine array 1410, and the number of rows determines the required memory bandwidth for achieving maximum utilization of the processing engine array 1410. The processing engine array 1410 can have, for example, 64 columns and 128 rows, or some other number of columns and/or rows.

An example of a processing engine 1411 is illustrated in FIG. 14 in an inset diagram. As illustrated by this example, a processing engine 1411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1411.

In the illustrated example, an input from above can include a partial sum, pin, provided either from another processing engine 1411 or from a previous round of computation by the processing engine array 1410. When starting a computation for a new set of input data, the top row of the processing engine array 1410 can receive a fixed value for p_in, such as zero. As illustrated by this example, i and w are multiplied together and the result is summed with p_in to produce a new partial sum, pout, which can be input into another processing engine 1411. Various other implementations of the processing engine 1411 are possible.

Outputs from the last row in the processing engine array 1410 can be temporarily stored in the results buffer 1412. The results can be intermediate results, which can be written to the memory banks 1414 to be provided to the processing engine array 1410 for additional computation. Alternatively, the results can be final results, which, once written to the memory banks 1414 can be read from the memory subsystem 1404 over the communication fabric 1420, to be output by the system.

In some implementations, the accelerator 1402 includes an activation engine 1416. In these implementations, the activation engine 1416 can combine the results from the processing engine array 1410 into one or more output activations. For example, for a convolutional neural network, convolutions from multiple channels can be summed to produce an output activation for a single channel. In other examples, accumulating results from one or more columns in the processing engine array 1410 may be needed to produce an output activation for a single node in the neural network. In some examples, activation engine 1416 can be bypassed.

In various examples, the activation engine 1416 can include multiple separate execution channels. In these examples, the execution channels can correspond to the columns of the processing engine array 1410, and can perform an operation on the outputs of a column, the result of which can be stored in the memory subsystem 1404. In these examples, the activation engine 1416 may be able to perform between 1 and n parallel computations, where n is equal to the number of columns in the processing engine array 1410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1402 can include a pooling engine 1418. Pooling is the combining of outputs of the columns of the processing engine array 1410. Combining can include for example, computing a maximum value, a minimum value, an average value, a median value, a summation, a multiplication, or another logical or mathematical combination. In various examples, the pooling engine 1418 can include multiple execution channels that can operating on values from corresponding columns of the processing engine array 1410. In these examples, the pooling engine 1418 may be able to perform between 1 and n parallel computations, where n is equal to the number of columns in the processing engine array 1410. In various examples, execution channels of the pooling engine 1418 can operate in parallel and/or simultaneously. In some examples, the pooling engine 1418 can be bypassed.

In some implementations, the accelerator 1402 can further include a vector engine 1417. Vector engine 1417 is a compute engine that can perform computations and manipulations on values stored in memory subsystem 1404 and/or results buffer 1412 such as values representing matrices of input values, weight values, intermediate results, etc. Vector engine 1417 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1417 can operate in parallel and/or simultaneously. In some examples, the vector engine 1417 can be bypassed or be omitted.

Herein, the activation engine 1416, the vector engine 1417, and the pooling engine 1418 may be referred to collectively as execution engines. The processing engine array 1410 is another example of an execution engine. Another example of an execution engine is a Direct Memory Access (DMA) engine, which may be located outside the accelerator 1402.

Input data 1450 can arrive over the communication fabric 1420. The communication fabric 1420 can connect the accelerator 1402 to other components of a processor, such as a DMA engine that can obtain input data 1450 from an Input/Output (I/O) device, a storage drive, or a network interface. The input data 1450 can be, for example one-dimensional data, such as a character string or numerical sequence, or two-dimensional data, such as an array of pixel values for an image or frequency and amplitude values over time for an audio signal. In some examples, the input data 1450 can be three-dimensional, as may be the case with, for example, the situational information used by a self-driving car or virtual reality data. In some implementations, the memory subsystem 1404 can include a separate buffer for the input data 1450. In some implementations, the input data 1450 can be stored in the memory banks 1414 when the accelerator 1402 receives the input data 1450.

In some examples, the accelerator 1402 can implement a neural network processing engine. In these examples, the accelerator 1402, for a set of input data 1450, can execute a neural network to perform a task for which the neural network was trained. Executing a neural network on a set of input data can be referred to as inference or performing inference.

The weights for the neural network can be stored in the memory subsystem 1404, along with input data 1450 on which the neural network will operate. The neural network can also include instructions, which can program the processing engine array 1410 to perform various computations on the weights and the input data. The instructions can also be stored in the memory subsystem 1404, in the memory banks 1414 or in a separate instruction buffer. The processing engine array 1410 can output intermediate results, which represent the outputs of individual layers of the neural network. In some cases, the activation engine 1416, the vector engine 1417, and/or pooling engine 1418 may be enabled for computations called for by certain layers of the neural network. The accelerator 1402 can store the intermediate results in the memory subsystem 1404 for inputting into the processing engine array 1410 to compute results for the next layer of the neural network. The processing engine array 1410 can further output final results from a last layer of the neural network. The final results can be stored in the memory subsystem 1404 and then be copied out to host processor memory or to another location.

Figure 15:
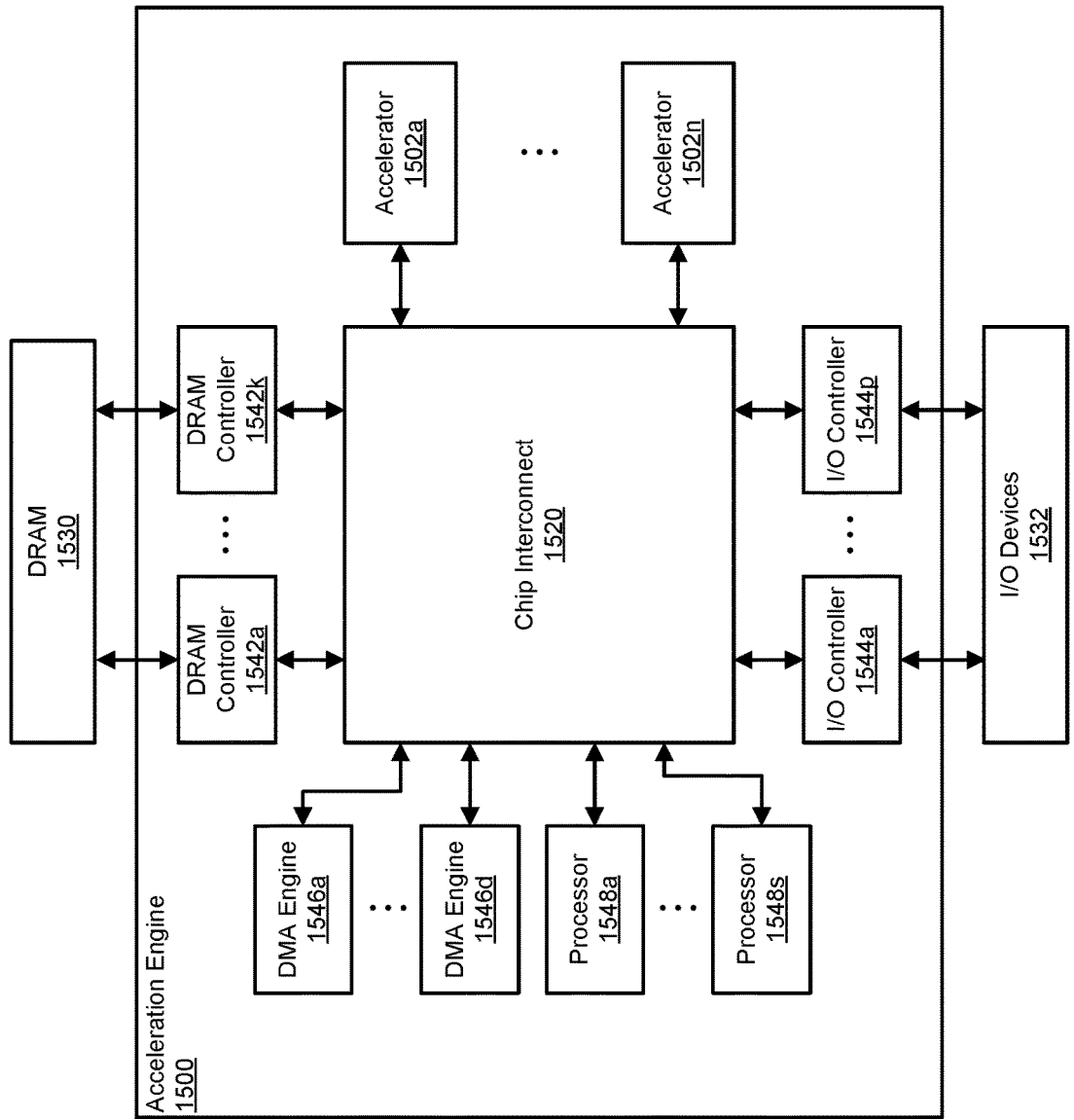
FIG. 15 illustrates a block diagram of an example of an acceleration engine.

FIG. 15 includes a block diagram that illustrates an example of an acceleration engine 1500. The acceleration engine 1500 is an example of an integrated circuit that can include one or more accelerators 1502a-1502n that may be similar to the accelerator illustrated in FIG. 14.

In the example of FIG. 15, the acceleration engine 1500 includes multiple accelerators 1502a-1502n, each of which can perform a set of operations. In various examples, the accelerators 1502a-1502n are for particular types of operations, so that the accelerators 1502a-1502n can perform the operations much faster than when similar operations are performed by a general-purpose processor. In various examples, to perform a set of operations, input data on which the operations are to be performed must first be moved into the accelerators 1502a-1502n. Additionally, in some cases, program code is also moved into the accelerators 1502a-1502n, which programs the operations that the accelerators 1502a-1502n will perform on the data. In the illustrated example, the acceleration engine 1500 includes n accelerators 1502a-1502n. Examples of accelerators that can be included in the acceleration engine 1500 include graphics accelerators, floating point accelerators, neural network accelerators, and others. In various examples, the accelerators 1502a-1502n can each be the same (e.g., each of the is a graphics accelerator) or can be different (e.g., the accelerators 1502a-1502n include a graphics accelerator, a floating point accelerator, and neural network accelerator).

The example acceleration engine 1500 further includes DRAM controllers 1542a-1542k for communicating with an external memory. The external memory is implemented, in this example, using DRAM 1530. In the illustrated example, the acceleration engine 1500 includes k DRAM controllers 1542a-1542k, each of which may be able to communicate with an independent set of banks of DRAM. In other examples, other types of RAM technology can be used for the external memory. The DRAM controllers 1542a-1542k can also be referred to as memory controllers.

In various examples, input data and/or program code for the accelerators 1502a-1502n can be stored in the DRAM 1530. Different programs can cause the accelerators 1502a-1502n to perform different operations. For example, when one of the accelerators is a neural network accelerator, one program can configure the neural network accelerator to perform speech recognition while another program can configure the neural network accelerator to perform image recognition. In various examples, different accelerators 1502a-1502n can be programmed with different programs, so that each performs a different set of operations. In various examples, the processors 1548a-1548s can manage moving of program code from the DRAM 1530 to the accelerators 1502a-1502n.

The example acceleration engine 1500 further includes I/O controllers 1544a-1544p for communicating with I/O devices 1532 in the system. The acceleration engine 1500 can communicate with I/O devices over, for example, a processor bus. In some examples, the processor bus can be implemented using Peripheral Component Interconnect (PCI) and/or a variation of the PCI bus protocol. The processor bus can connect the acceleration engine 1500 to I/O devices such as, for example, input and output devices, memory controllers, storage devices, and/or network interface cards, among other things. In some examples, the I/O controllers 1544-1544p can enable the acceleration engine 1500 to act as an I/O device for a host processor. For example, the acceleration engine 1500 can be the recipient of input data from the host processor, and a command indicating an operation to be performed on the input data (e.g., a particular computation or analysis). In the illustrated example, the acceleration engine 1500 includes p I/O controllers 1544a-1544p, each of which may include a separate root complex and may communicate with a separate set of I/O devices 1532. In other examples, other standardized bus protocols, such as Ultra Path Interconnect (UPI) can be used for the host bus. In other examples, a proprietary bus protocol can be used.

Movement of data in the acceleration engine 1500 can be managed by one or more processors 1548a-1548s, which can also be referred to as data management processors. In the example of FIG. 15, the acceleration engine 1500 includes s processors 1548a-1548s incorporated into the device (e.g., on the same silicon die). In other examples, the processors 1548a-1548s can be external to the acceleration engine 1500 (e.g., on a different die and/or in a different package). In some examples, the processors 1548a-1548s can manage the movement of data from I/O devices 1532 to the accelerators 1502a-1502n or the DRAM 1530. For example, input data may be located at an I/O device 1532 or in processor memory, and the processors 1548a-1548s can move the input from the I/O device 1532 or processor memory into an accelerator or into DRAM 1530. As another example, program code for the accelerators 1502a-1502n may be located on an I/O device 1532 or in processor memory.

The example acceleration engine 1500 further includes DMA engines 1546a-1546d that can move data between the accelerators 1502a-1502n, DRAM controllers 1542a-1542k, and I/O controllers 1544a-1544p. In the illustrated example, the acceleration engine 1500 includes d DMA engines 1546a-1546d. In some implementations, the DMA engines 1546a-1546d can be assigned to specific tasks, such as moving data from the DRAM controllers 1542a-1542d to the accelerators 1502a-1502n, or moving data between the I/O controllers 1544a-1544p and the accelerators 1502a-1502n. These tasks can be assigned, for example, by enqueueing descriptors with the DMA engines 1546a-1546d, where a descriptor identifies an address for a block of data and an operation (e.g., a read or a write) to perform. A descriptor, for example, can direct a DMA engine to instruct a DMA controller to read a block of data from DRAM 1530. A descriptor can, as a further example, instruct the DMA engine to write data, read by the DMA controller, to an accelerator. Further descriptors can be used to move data from an accelerator to DRAM 1530.

In various examples, each of the processors 1548a-1548s can be responsible for managing the data movement for a different accelerator. In some examples, a processor may manage the data movement for more than one accelerator. Similarly, in various examples, each of the processors 1548a-1548s can be assigned to one or more DMA engines 1546a-1546d. In these and other examples, associations between processors 1548a-1548s, accelerators 1502a-

1502n, and DMA engines 1546a-1546d are determined by program code being executed by each respective processor.

In the example acceleration engine 1500, the various components can communicate over a chip interconnect 1520. The chip interconnect 1520 primarily includes wiring for routing data between the components of the acceleration engine 1500. In some cases, the chip interconnect 1520 can include a minimal amount of logic, such as multiplexors to control the direction of data, flip-flops for handling clock domain crossings, and timing logic.

Figure 16:
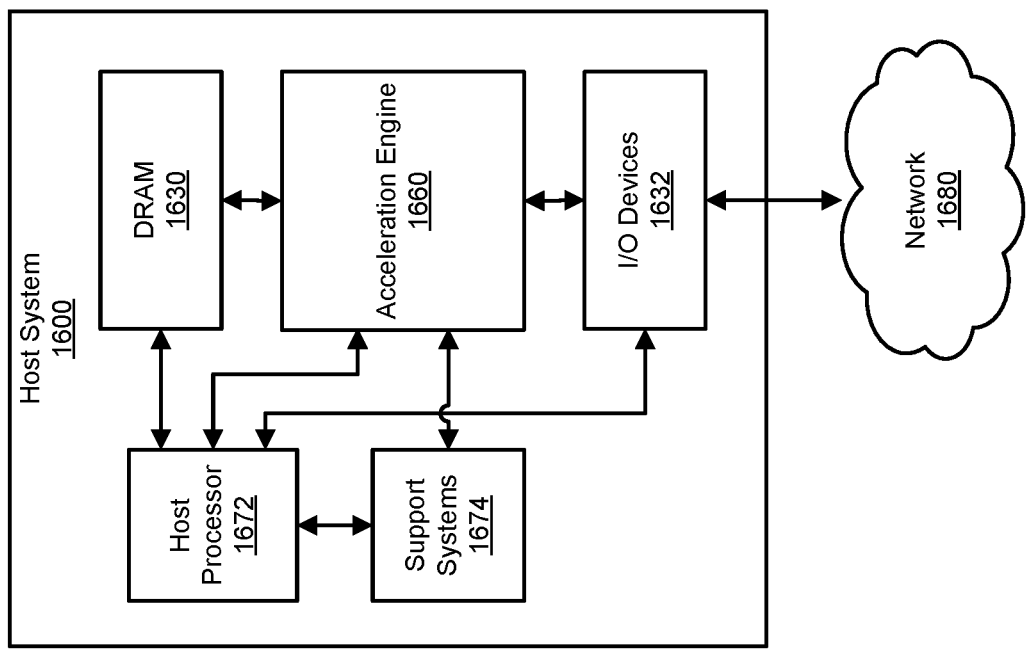
FIG. 16 illustrates a block diagram of an example of a host system.

FIG. 16 includes a block diagram that illustrates an example of a host system 1600 in which an acceleration engine 1660 can be used. The acceleration engine 1660 of FIG. 16 is an example of a device that can include one or more accelerators such as is illustrated in FIG. 15. The example host system 1600 of FIG. 16 includes the acceleration engine 1660, a host processor 1672, DRAM 1630 or processor memory, I/O devices 1632, and support systems 1674. In various implementations, the host system 1600 can include other hardware that is not illustrated here.

The host processor 1672 is a general-purpose integrated circuit that is capable of executing program instructions. In some examples, the host processor 1672 can include multiple processing cores. A multi-core processor may include multiple processing units within the same processor. In some examples, the host system 1600 can include more than one host processor 1672. In some examples, the host processor 1672 and the acceleration engine 1660 can be one chip, such as, one or more integrated circuits within the same package.

In various examples, the host processor 1672 can communicate with other components in the host system 1600 over one or more communication channels. For example, the host system 1600 can include a host processor bus, which the host processor 1672 can use to communicate with the DRAM 1630, for example. As another example, the host system 1600 can include an I/O bus, such as a PCI-based bus, over which the host processor 1672 can communicate with the acceleration engine 1660 and/or the I/O devices 1632, for example. In various examples, the host system 1600 can, alternatively or additionally, include other communication channels or busses, such as serial busses, power management busses, storage device busses, and so on.

In some examples, software programs executing on the host processor 1672 can receive or generate input for processing by the acceleration engine 1660. In some examples, the programs can select an appropriate neural network to execute for a given input. For example, a program may be for language translation, and can select one or more neural networks capable of speech recognition and/or machine translation. In these and other examples, the programs can configure the acceleration engine 1660 with the neural network to execute, and/or can select a neural network processing engine on the acceleration engine 1660 that has previously been configured to execute the desired neural network. In some examples, once the acceleration engine 1660 has started an inference on input data, the host processor 1672 can manage the movement of data (such as weights, instructions, intermediate results, results of conditional layers, and/or final results) into or out of the acceleration engine 1660.

In some examples, a software program that is using the acceleration engine 1660 to conduct an inference can read the result from a conditional layer from the acceleration engine 1660 and/or from a storage location, such as in DRAM 1630. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1630 is memory that is used by the host processor 1672 for storage of program code that the host processor 1672 is in the process of executing, as well as values that are being operated on. In some examples, the data for a neural network (e.g., weight values, instructions, and other data) can be all or partially stored in the DRAM 1630. DRAM is a common term for processor memory, and though DRAM is volatile memory, processor memory can be volatile and/or non-volatile. Though not illustrated here, the host system 1600 can include other volatile and non-volatile memories for other purposes. For example, the host system 1600 can include a Read-Only Memory (ROM) that stores boot code for booting the host system 1600 at power on, and/or Basic Input/Output System (BIOS) code.

Though not illustrated here, the DRAM 1630 can store instructions for various programs, which can be loaded into and be executed by the host processor 1672. For example, the DRAM 1630 can be storing instructions for an operating system, one or more data stores, one or more application programs, one or more drivers, and/or services for implementing the features disclosed herein.

The operating system can manage and orchestrate the overall operation of the host system 1600, such as scheduling tasks, executing applications, and/or controller peripheral devices, among other operations. In some examples, a host system 1600 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1600. For example, some drivers can provide communication between the operating system and peripheral devices or I/O devices 1632. Alternatively or additionally, some drivers may provide communication between application programs and the operating system, and/or application programs and peripheral devices accessible to the host system 1600. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1632 can include hardware for connecting to user input and output devices, such as keyboards, mice, pens, tablets, voice input devices, touch input devices, displays or monitors, speakers, and printers, among other devices. The I/O devices 1632 can also include storage drives and/or network interfaces for connecting to a network 1680. For example, the host system 1600 can use a network interface to communicate with storage devices, user terminals, other computing devices or servers, and/or other networks, among various examples.

In various examples, one or more of the I/O devices 1632 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1600 or may be in an external enclosure. A storage device can be fixed (e.g., attached by screws) or removable (e.g., having a physical release mechanism and possibly a hot-plug mechanism).

Storage devices, the DRAM 1630, and any other memory component in the host system 1600 are examples of computer-readable storage media. Computer-readable storage media are physical mediums that are capable of storing data in a format that can be read by a device such as the host processor 1672. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1632 can be PCI-based devices. In these examples, a PCI-based I/O device includes a PCI interface for communicating with the host system 1600. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1674 can include hardware for coordinating the operations of the acceleration engine 1660. For example, the support systems 1674 can include a microprocessor that coordinates the activities of the acceleration engine 1660, including moving data around on the acceleration engine 1660. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1672. In some examples, the program executed by the microprocessor is stored on the hardware of microprocessor, or on a non-volatile memory chip in the host system 1600. In some examples, the microprocessor and the acceleration engine 1660 can be on chip, such as one integrated circuit on the same die and in the same package.

In some examples, the support systems 1674 can be responsible for taking instructions from the host processor 1672 when programs executing on the host processor 1672 request the execution of a neural network. For example, the host processor 1672 can provide the support systems 1674 with a set of input data and a task that is to be performed on the set of input data. In this example, the support systems 1674 can identify a neural network that can perform the task, and can program the acceleration engine 1660 to execute the neural network on the set of input data. In some examples, the support systems 1674 only needs to select an appropriate neural network processing engine of the neural network processor. In some examples, the support systems 1674 may need to load the data for the neural network onto the acceleration engine 1660 before the acceleration engine 1660 can start executing the neural network. In these and other examples, the support systems 1674 can further receive the output of executing the neural network, and provide the output back to the host processor 1672.

In some examples, the operations of the support systems 1674 can be handled by the host processor 1672. In these examples, the support systems 1674 may not be needed and can be omitted from the host system 1600.

In various examples, the host system 1600 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1600 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for operating a direct memory access engine, the method comprising:
    retrieving a first descriptor from a descriptor queue;
    determining that the first descriptor is a first tensorized header descriptor;
    setting a striding configuration to generate addresses at a first stride in a first striding dimension for a first repetition number of times, the first stride and the first repetition number being provided in the first tensorized header descriptor;
    retrieving a second descriptor from a descriptor queue;
    determining that the second descriptor is a second tensorized header descriptor;
    setting the striding configuration to generate addresses at the first stride in the first striding dimension for a first repetition number of times, and at a second stride in a second striding dimension for a second repetition number of times, the second stride and the second repetition number being provided in the second tensorized header descriptor;
    retrieving a third descriptor from the descriptor queue;
    determining that the third descriptor is a first tensorized template descriptor;
    generating a first set of tensorized memory descriptors using a first starting address and a first data transfer size provided in the first tensorized template descriptor, the first set of tensorized memory descriptors generated based on the striding configuration including the first stride in the first striding dimension and the second stride in the second striding dimension; and
    providing the first set of tensorized memory descriptors to a DMA interface to perform data transfers based on the first set of tensorized memory descriptors.

2. The method of claim 1, further comprising:
    retrieving a fourth descriptor from the descriptor queue;
    determining that the fourth descriptor is a second tensorized template descriptor;
    generating a second set of tensorized memory descriptors using a second starting address and a second data transfer size provided in the second tensorized template descriptor, the second set of tensorized memory descriptors generated based on the striding configuration including the first stride in the first striding dimension and the second stride in the second striding dimension; and
    providing the second set of tensorized memory descriptors to the DMA interface to perform data transfers based on the second set of tensorized memory descriptors.

3. The method of claim 1, further comprising:
    retrieving a fourth descriptor from the descriptor queue;
    determining that the fourth descriptor is a memory descriptor; and
    providing the memory descriptor to the DMA interface to perform data transfers based on the first set of tensorized memory descriptors.

4. The method of claim 3, further comprising:
    in response to determining that the fourth descriptor is a memory descriptor, resetting the striding configuration.

5. A method comprising:
    obtaining, by direct memory access (DMA) circuitry, a set of attributes from a descriptor queue, the set of attributes including a data transfer size, a starting address, and a striding configuration for multiple striding dimensions, wherein the striding configuration contains striding information for each striding dimension, and wherein the striding information includes a stride and a repetition number indicating a number of times to repeat striding in the corresponding striding dimension;
    generating, by the DMA circuitry, a set of tensorized memory descriptors that include addresses having multi-dimensional strides based on the set of attributes; and
    performing, by the DMA circuitry, data transfers according to the set of tensorized memory descriptors.

6. The method of claim 5, wherein the striding configuration is obtained from a set of tensorized header descriptors.

7. The method of claim 5, wherein the data transfer size and the starting address are obtained from a tensorized template descriptor in the descriptor queue.

8. The method of claim 6, wherein the set of tensorized header descriptors includes a tensorized header descriptor for each striding dimension of the multiple striding dimensions, and each tensorized header descriptor contains the striding information for one of the multiple striding dimensions.

9. The method of claim 8, wherein the set of tensorized header descriptors are obtained sequentially from the descriptor queue, and each successive tensorized header descriptor provides the striding information for a higher striding dimension.

10. The method of claim 7, wherein the tensorized template descriptor follows a tensorized header descriptor in the descriptor queue.

11. The method of claim 7, wherein the tensorized template descriptor includes a set of common fields that are included in each tensorized memory descriptor being generated from the tensorized template descriptor.

12. An integrated circuit device comprising:
    a data buffer;
    a descriptor queue operable to store descriptors;
    a direct memory access (DMA) interface operable to transfer data between the data buffer and a component of a computing system; and
    descriptor processing circuitry operable to:
        process descriptors from the descriptor queue to obtain a striding configuration to generate tensorized memory descriptors, wherein the striding configuration includes, for each striding dimension, a stride and a repetition number indicating a number of times to repeat striding in the corresponding striding dimension;
        generate multiple sets of tensorized memory descriptors based on the striding configuration; and
        provide the DMA interface with the sets of tensorized memory descriptors to perform data transfers.

13. The integrated circuit device of claim 12, wherein the descriptor processing circuitry is operable to process a tensorized header descriptor from the descriptor queue by adding a striding dimension to the striding configuration used for generating the tensorized memory descriptors, wherein the tensorized header descriptor contains the stride and the repetition number for the corresponding striding dimension.

14. The integrated circuit device of claim 12, wherein the descriptor processing circuitry is operable to process a tensorized template descriptor from the descriptor queue by generating a set of tensorized memory descriptors based on the striding configuration using a starting address provided in the tensorized template descriptor.

15. The integrated circuit device of claim 12, wherein the descriptor queue is operable to store a descriptor packet that includes, sequentially, a tensorized header descriptor, a first tensorized template descriptor, and a second tensorized template descriptor, and
  wherein the descriptor processing circuitry is operable to process the descriptor packet by:
    setting the striding configuration to generate addresses at a stride provided in the tensorized header descriptor;
    generating a first set of tensorized memory descriptors based on the striding configuration using a first starting address provided in the first tensorized template descriptor; and
    generating a second set of tensorized memory descriptors based on the striding configuration using a second starting address provided in the second tensorized template descriptor.

16. The integrated circuit device of claim 12, wherein the descriptor queue is operable to store a descriptor packet that includes, sequentially, a first tensorized header descriptor, a second tensorized header descriptor, and a first tensorized template descriptor, and
  wherein the descriptor processing circuitry is operable to process the descriptor packet by:
    setting the striding configuration to generate addresses at a first stride in a first dimension and a second stride in a second dimension higher than the first dimension, the first stride being provided in the first tensorized header descriptor and the second stride being provided in the second tensorized header descriptor; and
    generating a first set of tensorized memory descriptors based on the striding configuration using a first starting address provided in the first tensorized template descriptor.

17. The integrated circuit device of claim 13, wherein the descriptors from the descriptor queue includes sequential tensorized header descriptors, and each sequential tensorized header descriptor adds a higher striding dimension to the striding configuration.

18. The integrated circuit device of claim 14, wherein the descriptor processing circuitry is operable to process sequential tensorized template descriptors having different starting addresses by generating a set of tensorized memory descriptors for each sequential tensorized template descriptor based on the same striding configuration, wherein each set of tensorized memory descriptors being generated uses a different starting address.

19. The integrated circuit device of claim 14, wherein the tensorized template descriptor further includes a data transfer size.

20. The integrated circuit device of claim 16, wherein the descriptor packet further includes a second tensorized template descriptor following the first tensorized template descriptor, and
  wherein the descriptor processing circuitry is operable to process the second tensorized template descriptor by generating a second set of tensorized memory descriptors using a second starting address provided in the second tensorized template descriptor, the second set of tensorized memory descriptors generated based on the striding configuration including the first stride in the first dimension and the second stride in the second dimension.

21. The integrated circuit device of claim 19, wherein the descriptor processing circuitry is operable to process sequential tensorized template descriptors having different starting addresses and different data transfer sizes by generating a set of tensorized memory descriptors for each sequential tensorized template descriptor based on the same striding configuration, wherein each set of tensorized memory descriptors being generated uses a different starting address and a different data transfer size.

\* \* \* \* \*